US012807870B2

(12) United States Patent
Choi et al.

(10) Patent No.: US 12,807,870 B2
(45) Date of Patent: Nov. 24, 2026

(54) SCINTILLATOR AND RELATED METHODS AND DEVICES

(71) Applicant: University of Virginia Patent Foundation, Charlottesville, VA (US)

(72) Inventors: Joshua J. Choi, Charlottesville, VA (US); Katelyn Ann Dagnall, Charlottesville, VA (US); Ashley Conley, Charlottesville, VA (US); Seung-Hun Lee, Charlottesville, VA (US)

(73) Assignee: University of Virginia Patent Foundation, Charlottesville, VA (US)

(*) Notice: Subject to any disclaimer, the term of this patent is extended or adjusted under 35 U.S.C. 154(b) by 73 days.

(21) Appl. No.: 18/707,152

(22) PCT Filed: Nov. 2, 2022

(86) PCT No.: PCT/US2022/048708
§ 371 (c)(1),
(2) Date: May 2, 2024

(87) PCT Pub. No.: WO2023/081215
PCT Pub. Date: May 11, 2023

(65) Prior Publication Data

US 2024/0425753 A1 Dec. 26, 2024

Related U.S. Application Data

(60) Provisional application No. 63/263,491, filed on Nov. 3, 2021.

(51) Int. Cl.
*C09K 11/77* (2006.01)
*C01G 21/00* (2006.01)
(Continued)

(52) U.S. Cl.
CPC ........ *C09K 11/7701* (2013.01); *C01G 21/006* (2013.01); *G01T 1/2018* (2013.01);
(Continued)

(58) Field of Classification Search
None
See application file for complete search history.

(56) References Cited

U.S. PATENT DOCUMENTS

2005/0285041 A1 12/2005 Srivastava et al.
2007/0184576 A1 8/2007 Chang et al.
(Continued)

FOREIGN PATENT DOCUMENTS

CN 113594370 A 11/2021
WO 2020214942 A1 10/2020

OTHER PUBLICATIONS

Crane, Matthew J. et al., "Single-Source Vapor Deposition of Quantum-Cutting $Yb^3$+:$CsPb(Cl_{1}$-$_{x}Br_{x})_{3}$ and Other Complex Metal-Halide Perovskites," ACS Applied Energy Materials, vol. 2, 2019 (Published May 24, 2019), pp. 4560-4565.
(Continued)

*Primary Examiner* — Edwin C Gunberg
(74) *Attorney, Agent, or Firm* — Robert J. Decker

(57) ABSTRACT

A method of forming a lanthanide or transition metal doped metal halide perovskite material whereby the method includes combining a monovalent metal cation-halide compound, a divalent metal cation-halide compound, and a lanthanide or transition metal halide compound in a solvent; evaporating the solvent to form a powder; and annealing the powder to form the lanthanide or transition metal doped metal halide perovskite material. The resultant materials or devices may be applied to various industrial applications or implemented as a scintillator and applied to various industrial applications.

40 Claims, 15 Drawing Sheets

(51) Int. Cl.
*G01T 1/20* (2006.01)
*G01T 1/202* (2006.01)

(52) U.S. Cl.
CPC ........ *G01T 1/2023* (2013.01); *C01P 2002/34* (2013.01); *C01P 2002/54* (2013.01); *C01P 2002/72* (2013.01); *C01P 2004/03* (2013.01); *C01P 2006/60* (2013.01)

(56) References Cited

U.S. PATENT DOCUMENTS

| | | | | |
|---|---|---|---|---|
| 2010/0230601 | A1 | 9/2010 | Martins Loureiro et al. | |
| 2010/0243877 | A1 | 9/2010 | Berheide et al. | |
| 2012/0001074 | A1 | 1/2012 | Hardy et al. | |
| 2013/0299720 | A1 | 11/2013 | Osinski et al. | |
| 2015/0083923 | A1 | 3/2015 | Stanton et al. | |
| 2016/0293858 | A1 | 10/2016 | Brandt et al. | |
| 2021/0242357 | A1* | 8/2021 | Gamelin ................ | C09K 11/06 |
| 2022/0195287 | A1 | 6/2022 | Choi et al. | |
| 2023/0207149 | A1* | 6/2023 | Cao ........................ | H10K 30/50 136/243 |

OTHER PUBLICATIONS

Karmakar, Abhoy et al., "Mechanochemical Synthesis of OD and 3D Cesium Lead Mixed Halide Perovskites," Electronic Supplementary Information (ESI) for Chemical Communications, vol. 35, 2019, pp. SI-S15.

Pal, Provas et al., "All-Solid-State Mechanochemical Synthesis and Post-Synthetic Transformation of Inorganic Perovskite-type Halides," Chemistry—A European Journal, vol. 24, 2018 (Version of Record Online Jan. 16, 2018 ), pp. 1811-1815.

Kroupa, Daniel M. et al., "Quantum-Cutting Ytterbium-Doped $CsPb(Cl_{1-x}Br_x)_3$ Perovskite Thin Films with Photoluminescence Quantum Yields over 190%," ACS Energy Letters, vol. 3, 2018 (Published: Sep. 11, 2018), pp. 2390-2395.

Dagnall, Katelyn A. et al., "Ytterbium-Doped Cesium Lead Chloride Perovskite as an X-ray Scintillator with High Light Yield," ACS Omega, vol. 7, 2022 (Published Jun. 6, 2022), pp. 20968-20974.

Zhou, Yang et al., "Metal-Doped Lead Halide Perovskites: Synthesis, Properties, and Optoelectronic Applications," Chemistry Materials, vol. 30, 2018 (Published Aug. 27, 2018), pp. 6589-6613.

Luo, Binbin et al., "B-Site Doped Lead Halide Perovskites: Synthesis, Band Engineering, Photophysics, and Light Emission Applications," Journal of Materials Chemistry C, vol. 7, 2019 (Published Jan. 25, 2019), pp. 2781-2808.

WIPO, "International Search Report and Written Opinion of the International Search Authority", International Patent Application No. PCT/US2022/048708, mailed on Mar. 10, 2023, 7 pages.

* cited by examiner

SCINTILLATOR AND RELATED METHODS AND DEVICES

CROSS REFERENCE TO RELATED APPLICATIONS

The present application is a national stage filing of International Application No. PCT/US2022/048708, filed Nov. 2, 2022, which claims benefit of priority under 35 U.S.C § 119 (e) from U.S. Provisional Application Ser. No. 63/263,491, filed Nov. 3, 2021, entitled "Scintillator and Method"; the disclosure of which are hereby incorporated by reference herein in their entirety.

STATEMENT OF GOVERNMENT INTEREST

This invention was made with government support under Grant No. 20CWDARI00034-01-00, awarded by the Department of Homeland Security. The government has certain rights in the invention.

FIELD OF INVENTION

The present disclosure relates generally to doped perovskite materials for scintillator devices and methods. More particularly, the present disclosure relates to a method of making the doped perovskite materials and various devices for use with the manufactured materials.

BACKGROUND

High energy photons, such as x-rays and gamma (γ)-rays, are used in non-invasive, non-destructive image creation applications (in both the medical, industrial, and security fields) to probe the internal structure and/or composition of an object. This is due to the high penetration ability of the incident radiation where the amount of penetration/transmission of the incident radiation varies based on the density and/or composition of the material inside the object. In order to detect the difference in amount of penetration/transmission of the incident high energy radiation, a scintillator material can be employed. Scintillators, or scintillation materials, refer to materials that once impinged by ionizing radiation, emit photons in the ultraviolet to visible to near-infrared range of wavelengths. These materials are commonly used to detect radiation from γ-rays, x-rays, α-particles, β-particles, neutrons, protons, and/or electrons.

However, current scintillator materials have limitations. The inorganic materials typically used display hygroscopic properties where exposure to and absorption of moisture from the external environment can render the material ineffective. Additionally, many current scintillators use large single crystals, making the fabrication of these devices expensive and complicated and limits the number of detector geometries that are accessible for fabrication. Furthermore, detection efficiency of the emitted photons (i.e., the emission wavelengths that enable maximum/maximized detection efficiency) presents additional issues in deploying current scintillator materials in scintillator sensor/detector-coupled systems. Accordingly, a need exists for improved scintillators and related materials and devices.

SUMMARY OF ASPECTS OF EMBODIMENTS OF THE PRESENT INVENTION

Embodiments described herein generally relate to doped perovskite materials for scintillator devices and methods. Scintillators are materials that convert high energy particles or photons to low energy photons. Scintillators have applications in such devices as nuclear batteries, solar cells, medical equipment, and high energy particle/photon detectors. However, the present invention is not limited to the abovementioned fields.

Nuclear battery devices can be used in a variety of situations as desired or required, including but not limited thereto, situations that require remote power generation. Examples of remote applications may include, but not limited thereto, the following: deep space probes, soldiers in battlefield, ships, ocean exploration, vehicles, aircraft, etc. Additionally, as long as the nuclear batteries can be manufactured and stored safely, then the nuclear batteries may be used in other applications such as, but not limited thereto, power sources for commercial and residential buildings.

A metal halide perovskite has the structure of $ABX_3$, where A is a monovalent metal cation, B is a divalent metal cation, and X is a halide. Metal halide perovskites occur in a crystal structure that can be used for, among other things, scintillation. Scintillation involved taking a high energy particle, such as a gamma/x-ray photon, or an alpha or beta particle, and converting it into a relatively low energy photon, such as an ultraviolet, visible light, or infrared photon. The low-energy photon can then be detected through standard low-energy photon detection methods or can be used in power generation through standard lower-energy photon power generation methods. The reason the high energy particles cannot be detected or harnessed directly (without scintillation) is that they are very penetrative by virtue of their high energy, so they will often go through any detector. A scintillator, such as a metal halide perovskite, works by absorbing the energy from the photon/other particle, which will excite an electron within the metal halide perovskite to jump up to a higher energy level. When said electron goes back to its lower energy level, it will release a photon equal in energy to the gap between two aforementioned energy levels. In an embodiment, said photon will ideally be in the visible light spectrum, and will always be lower in energy to the incident photon/particle.

An aspect of an embodiment of the present invention provides, among other things, a method of forming a lanthanide or transition metal doped metal halide perovskite material. The method includes: combining a monovalent metal cation-halide compound, a divalent metal cation-halide compound, and a lanthanide or transition metal halide compound in a solvent; evaporating the solvent to form a powder; and annealing the powder to form the lanthanide or transition metal doped metal halide perovskite material. In an embodiment, annealing the powder includes annealing at or below about 200 degrees C. The annealing can be performed at a temperature greater than 200 degrees C.

An aspect of an embodiment of the present invention provides, among other things, a method of forming a lanthanide or transition metal doped metal halide perovskite material. The method includes: combining cesium chloride, lead chloride, and lanthanide or transition metal chloride compound in a solvent; evaporating the solvent to form a powder; and annealing the powder to form the lanthanide or transition metal doped metal cesium lead chloride. In an embodiment, whereby the annealing of the powder to form lanthanide or transition metal doped cesium lead chloride includes: annealing to form said lanthanide or transition metal doped cesium lead chloride with a dopant ion concentration below about 5 percent. In an embodiment, annealing the powder includes annealing at or below about 200 degrees C. The annealing can be performed at a temperature greater than 200 degrees C.

An aspect of an embodiment of the present invention provides, among other things, a method of forming an ytterbium doped metal halide perovskite material. The method includes: combining a monovalent metal cation-halide compound, a divalent metal cation-halide compound, and an ytterbium halide compound in a solvent; evaporating the solvent to form a powder; and annealing the powder to form the ytterbium doped metal halide perovskite material. In an embodiment, annealing the powder includes annealing at or below about 200 degrees C. The annealing can be performed at a temperature greater than 200 degrees C.

An aspect of an embodiment of the present invention provides, among other things, a method of forming an ytterbium doped metal halide perovskite material. The method includes: combining cesium chloride, lead chloride, and ytterbium chloride in a solvent; evaporating the solvent to form a powder; and annealing the powder to form the ytterbium doped metal cesium lead chloride. In an embodiment, whereby the annealing of the powder to form ytterbium doped cesium lead chloride includes: annealing to form said ytterbium doped cesium lead chloride with a $Yb^{3+}$ ion concentration below about 5 percent. In an embodiment, annealing the powder includes annealing at or below about 200 degrees C. The annealing can be performed at a temperature greater than 200 degrees C.

An aspect of an embodiment of the present invention provides, among other things, a photonic device that comprises either: a) a semiconductor directly or indirectly coupled to a first electrode and a second electrode, or b) a photomultiplier tube (PMT). Next, the photonic device comprises a lanthanide or transition metal doped metal halide perovskite material located adjacent to either: a) said semiconductor, said first electrode, and said second electrode in electromagnetic energy communication with said lanthanide or transition metal doped metal halide perovskite material, or b) said photomultiplier tube (PMT) in electromagnetic energy communication with said lanthanide or transition metal doped metal halide perovskite material. Further, the lanthanide or transition metal doped metal halide perovskite material is formed by a method including: combining a monovalent metal-halide compound, a divalent metal-halide compound, and a lanthanide or transition metal halide compound in a solvent; evaporating the solvent to form a powder; and annealing the powder to form a lanthanide or transition metal doped metal halide perovskite.

An aspect of an embodiment of the present invention provides, among other things, a photonic device that comprises either: a) a semiconductor directly or indirectly coupled to a first electrode and a second electrode, or b) a photomultiplier tube (PMT). Next, the photonic device comprises an ytterbium doped metal halide perovskite material located adjacent to either: a) said semiconductor, said first electrode, and said second electrode in electromagnetic energy communication with said ytterbium doped metal halide perovskite material, or b) said photomultiplier tube (PMT) in electromagnetic energy communication with said ytterbium doped metal halide perovskite material. Further, the ytterbium doped metal halide perovskite material is formed by a method including: combining a monovalent metal-halide compound, a divalent metal-halide compound, and an ytterbium-halide compound in a solvent; evaporating the solvent to form a powder; and annealing the powder to form an ytterbium doped metal halide perovskite.

An aspect of an embodiment of the present invention provides, among other things, a power source device that comprises an emission source; and a photonic device in emission communication with said emission source; and wherein the photonic device comprises either: a) a semiconductor directly or indirectly coupled between a first electrode and a second electrode, or b) a photomultiplier tube (PMT). Next, the power source device comprises a lanthanide or transition metal doped metal halide perovskite material located adjacent to either a) said semiconductor, said first electrode, and said second electrode in electromagnetic energy communication with said lanthanide or transition metal doped metal halide perovskite material, or b) said photomultiplier tube (PMT) in electromagnetic energy communication with said lanthanide or transition metal doped metal halide perovskite material. Further, the lanthanide or transition metal doped metal halide perovskite material is formed by a method including: combining a monovalent metal-halide compound, a divalent metal-halide compound, and a lanthanide or transition metal halide compound in a solvent; evaporating the solvent to form a powder; and annealing the powder to form a lanthanide or transition metal doped metal halide perovskite material.

An aspect of an embodiment of the present invention provides, among other things, a power source device that comprises an emission source; and a photonic device in emission communication with said emission source; and wherein the photonic device comprises either: a) a semiconductor directly or indirectly coupled between a first electrode and a second electrode, or b) a photomultiplier tube (PMT). Next, the power source device comprises an ytterbium doped metal halide perovskite material located adjacent to either a) said semiconductor, said first electrode, and said second electrode in electromagnetic energy communication with said ytterbium doped metal halide perovskite material, or b) said photomultiplier tube (PMT) in electromagnetic energy communication with said ytterbium doped metal halide perovskite material. Further, the ytterbium doped metal halide perovskite material is formed by a method including: combining a monovalent metal-halide compound, a divalent metal-halide compound, and an ytterbium-halide compound in a solvent; evaporating the solvent to form a powder; and annealing the powder to form an ytterbium doped metal halide perovskite material.

BRIEF DESCRIPTION OF THE DRAWINGS

The foregoing and other objects, features, and advantages of the present invention, as well as the invention itself, will be more fully understood from the following description of preferred embodiments, when read together with the accompanying drawings.

The accompanying drawings, which are incorporated into and form a part of the instant specification, illustrate several aspects and embodiments of the present invention and, together with the description herein, serve to explain the principles of the invention. The drawings are provided only for the purpose of illustrating select embodiments of the invention and are not to be construed as limiting the invention.

DETAILED DESCRIPTION OF EXEMPLARY EMBODIMENTS

Figure 1A:
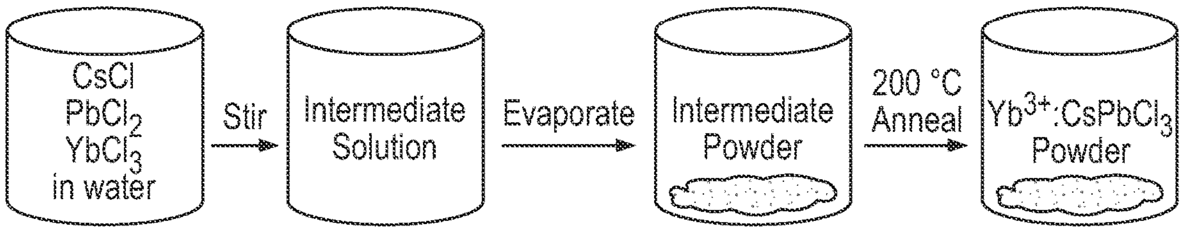
FIG. 1(A) shows a schematic of $Yb^{3+}$:$CsPbCl_3$ synthesis process.

An aspect of an embodiment of the present invention is related to ytterbium-doped metal halide perovskites. A metal halide perovskite is a compound that has a chemical structure of $ABX_3$, where A is a monovalent metal cation, B is a divalent metal cation, and X is a halide. The crystal structure of a metal halide perovskite makes it an excellent scintillator. A scintillator converts a high energy photon/particle to a low energy photon, allowing it to be detected/harnessed more easily. However, current techniques in making scintillators require large amounts of energy, and thus creating large scintillators cheaply is a current need. An aspect of an embodiment of the present invention involves doping the metal halide perovskite with ytterbium. This is done by combining the materials for producing the ytterbium-doped metal halide perovskite (which are a monovalent metal cation-halide compound, a divalent metal cation-compound, and an ytterbium-halide compound) in a solvent. The solvent is then evaporated, which will form a powder comprised of the combined starting materials. The powder is then annealed to get the crystal structure of a metal halide perovskite. The use of the solvent and the doping of ytterbium allow for this metal halide perovskite to be made at relatively low temperatures, and thus low energy costs, with annealing the material being able to be done under 200 degrees Celsius. The low energy costs of production for this compound allows it to be scaled up, opening up applications for large medical equipment and deep space probes, where scintillators are ordinarily used but can be cost prohibitive.

An aspect of an embodiment of the present invention scintillators or an aspect of an embodiment of the present invention device or material have applications in such devices, apparatuses, components, modules, or systems as, but not limited thereto, the following: nuclear batteries; solar cells; medical equipment; high energy particle/photon detectors; land, air, water and space craft; land, air, water, and space vehicles or equipment; power generation, supplies or source; building structures; and transportation systems or surfaces.

In recent years, rare-earth metal ytterbium doped cesium lead halides ($Yb^{3+}$:$CsPbX_3$, X=Cl and/or Br) have been established as quantum cutting materials with exceptionally high photoluminescence quantum yields. In this work, we harness its bright emission through the first use of ytterbium-doped cesium lead chloride ($Yb^{3+}$:$CsPbCl_3$) as a scintillator. Manufactured in a low temperature, water-based powder process, the $Yb^{3+}$:$CsPbCl_3$ presented has a far simpler fabrication method compared to current commercial scintillators. The powder is found to have complete $Yb^{3+}$ ion dispersion, with high purity at and below a doping concentration of 5 mol % $Yb^{3+}$. Optical characterization shows a large Stokes shift between the absorption onset at 440 nm, and the photoluminescent emission at 1,000 nm, preventing re-absorption from taking place. The champion composition of 5% $Yb^{3+}$:$CsPbCl_3$ possesses a room temperature light yield of 102,000 photons/MeV, making the material brighter than current commercial scintillator options. A pressed pellet was fabricated out of the 5% $Yb^{3+}$:$CsPbCl_3$ powder, and used to produce X-ray images with material differentiation and micrometer scale details. This work is the first evidence of radioluminescence in any $Yb^{3+}$:$CsPbX_3$, and the simple fabrication method and high light yield $Yb^{3+}$:$CsPbCl_3$ makes it a promising candidate for radiographic applications.

Metal halide perovskites (MHP), with chemical composition $ABX_3$ (A: monovalent cation, B: divalent metal, X: halide) have gained a great deal of interest in the past decade due to their unique optoelectronic properties and high device performances. With proper composition and crystallization control, metal halide perovskites can possess tunable bandgaps, high intrinsic defect tolerances, high charge carrier mobilities, large absorption coefficients, and near-unity photoluminescent quantum yields (PLQY). The low-cost solution processability of these materials additionally enables them to be used in printable, flexible, and non-planar device applications. For these reasons, metal halide perovskites have been studied to great success in the fields of solar cells, light emitting diodes, lasers, photodetectors, and more.

The doping of rare earth metal ytterbium ($Yb^{3+}$) in $CsPbX_3$ has recently been explored as a method to boost PLQY through a mechanism termed "quantum cutting". Through this mechanism, charge neutral defect centers composed of two $Yb^{3+}$ ions and one $Pb^{2+}$ vacancy at the B-site of $CsPbX_3$ convert one absorbed photon into up to two $Yb^{3+}$ emitted NIR photons, surpassing 100% PLQY. This phenomenon has been observed in nanocrystals, quantum dots, thin films, and mixed $Cl^-/Br^-$ halide compositions.

One potential application of $Yb^{3+}$:$CsPbX_3$ that would benefit from bright emission is as a scintillator for X-ray detection and imaging. Scintillation is the process of converting high energy photons into lower energy photons, and when coupled with a UV-Vis-NIR detector, is invaluable in the fields of medical imaging and security. Common commercial scintillators include metal doped cesium iodide and sodium iodide (CsI, NaI), $Lu_{1.8}Y_{0.2}SiO_5$:Ce(LYSO), $CdWO_4$, and plastic scintillators. These scintillators have combinations of high performance with high light yields (CsI(Tl) light yield: 65,000 photons/MeV radiation) and fast response times, but significant shortcomings in their complex fabrication methods. $Yb^{3+}$:$CsPbX_3$ may be able to compete with these commercially available scintillators: its high average atomic number and bright emission indicate the potential for high X-ray absorption and high light yield. However, the material has not yet been explored for the application of scintillation. Ytterbium material implemented as a scintillator would be the first use or first application of scintillation such as for X-ray detection and imaging and other applications disclosed herein. Although certain embodiments of the invention may include all lanthanides as a dopant, ytterbium exhibits quantum cutting behavior, which results in exceptional light yields, vastly increasing and potentially doubling expected light yields from similar materials. Because light yield is an important metric in the performance of a scintillator, ytterbium-doped MHP scintillators show greater performance than other similar materials. However, all lanthanide-doped MHPs may show increased light yields, as well transition metal-doped MHPs.

In this work, we present a bulk powder $Yb^{3+}$:$CsPbCl_3$ scintillator produced using water as the sole solvent, followed by evaporation and brief thermal annealing. The novel fabrication method uses low temperatures that do not exceed 200° C., which can be easily scaled for inexpensive, large volume manufacturing. Seven $Yb^{3+}$ doping concentrations were synthesized, with molar percents 0.5% through 60%. The structure was probed using X-ray diffraction, with impurity peaks occurring above 5%. Optical characterization of the 5% $Yb^{3+}$:$CsPbCl_3$ sample showed a large Stokes shift between the absorption onset at 440 nm and emission at 1,000 nm, with highly suppressed $CsPbCl_3$ excitonic emission at 406 nm. Radioluminescent activity was detected and optimized at the 5% $Yb^{3+}$:$CsPbCl_3$ composition, which has a measured room temperature light yield of 102,000 photons/MeV. The 5% $Yb^{3+}$:$CsPbCl_3$ powder was pressed into a pellet and successfully used for radiographic imaging. The results of this work encourage further exploration of $Yb^{3+}$ doped $CsPbCl_3$ as a low cost, high light yield scintillator.

Physical Characterization

The $Yb^{3+}$:$CsPbCl_3$ powder samples were prepared using a simple, water solution method, as illustrated in FIG. 1(A). FIG. 1(A) shows a schematic of $Yb^{3+}$:$CsPbCl_3$ synthesis process. Stoichiometric amounts of cesium chloride (CsCl), lead chloride ($PbCl_2$), and ytterbium chloride ($YbCl_3$) precursors were combined in de-ionized water, stirred at 38° C. for one hour, and evaporated at 65° C. The resultant powder was then finely crushed in a mortar and pestle, and annealed at 200° C. for one hour, stirring four times during the process. Seven powder samples were produced with varying $Yb^{3+}$ ion content from 0.5 mol % up to 60 mol %.

Figure 1B:
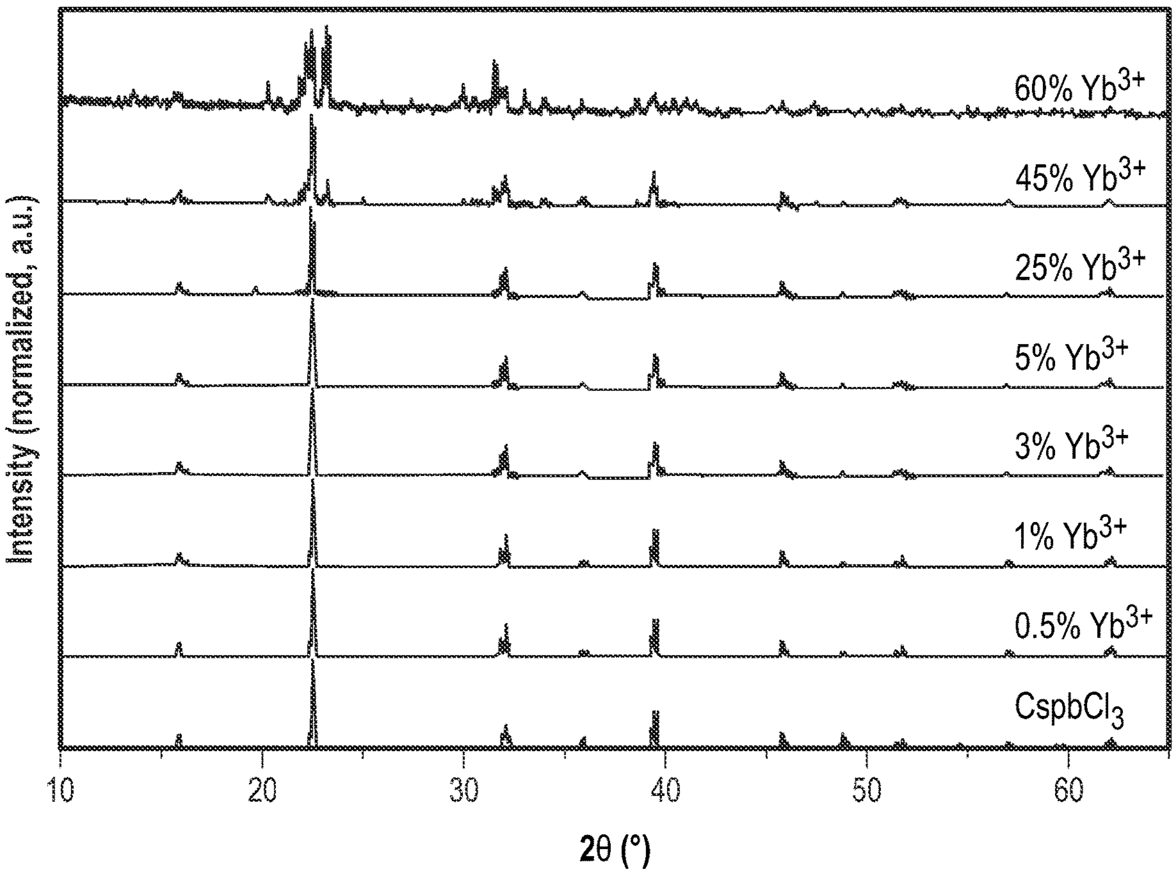
FIG. 1(B)) graphically shows X-ray diffraction patterns of $Yb^{3+}$:$CsPbCl_3$ samples with different Yb content and the orthorhombic phase of $CsPbCl_3$.

The X-ray diffraction patterns of the $Yb^{3+}$:$CsPbCl_3$ samples are shown in FIG. 1*b*, along with a reference pattern of orthorhombic (Pnma) $CsPbCl_3$. FIG. 1(B)) graphically shows X-ray diffraction patterns of $Yb^{3+}$:$CsPbCl_3$ samples with different Yb content and the orthorhombic phase of $CsPbCl_3$. The patterns match well to the $CsPbCl_3$ reference pattern, in agreement with previous structural reports in which $Yb^{3+}$ doping at low concentrations retain the bulk $CsPbCl_3$ crystal structure. The orthorhombic (Pnma) structure of these powder samples is consistent with $Yb^{3+}$:$CsPbCl_3$ powders made through solid state reaction and mechanochemical synthesis, and is in contrast with the cubic (Pm $\bar{3}$ m) structure of $Yb^{3+}$:$CsPbCl_3$ nanocrystals and quantum dots prepared with greater crystallization control. The (101) peak location shifts from a 2θ value of 22.44° in 0.5% $Yb^{3+}$:$CsPbCl_3$ sample, to a value of 22.41° in the 60% $Yb^{3+}$:$CsPbCl_3$ sample, suggesting that the substitution of the smaller $Yb^{3+}$ ion in the $Pb^{2+}$ position results in minor lattice compression. The presence of these structural effects supports the conclusion that the $Yb^{3+}$ ions have been incorporated into the $CsPbCl_3$ host lattice. In the 25%, 45%, and 60% $Yb^{3+}$:$CsPbCl_3$ compositions, the presence of peaks not matching to $CsPbCl_3$ are observed, indicating the formation of impurity species at $Yb^{3+}$ doping concentrations above 5%. Compositions at and below 5% $Yb^{3+}$ show that the simple, water-based fabrication method successfully produces high purity $CsPbCl_3$ samples with lattice incorporation of the $Yb^{3+}$ dopant.

Figure 1C:
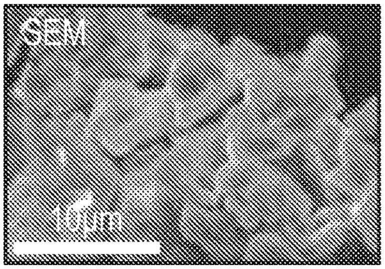
FIG. 1(C)) shows a scanning electron microscopy image of a 5% $Yb^{3+}$:$CsPbCl_3$ powder sample.
Figure 1D:
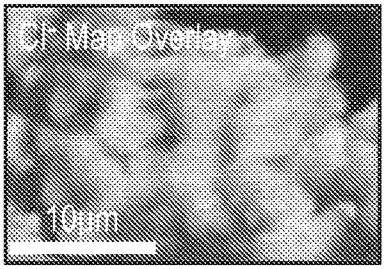
FIG. 1(D) shows energy dispersive X-ray spectroscopy overlay of $Cl^-$.
Figure 1E:
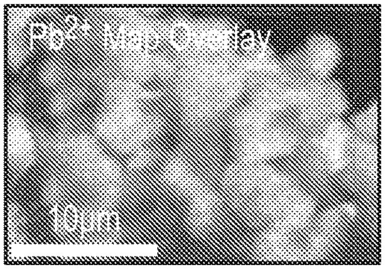
FIG. 1(E) shows energy dispersive X-ray spectroscopy overlay of $Pb^{2+}$.
Figure 1F:
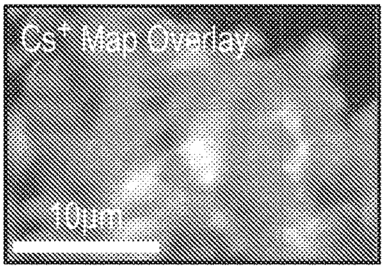
FIG. 1(F) shows energy dispersive X-ray spectroscopy overlay of $Cs^+$.
Figure 1G:
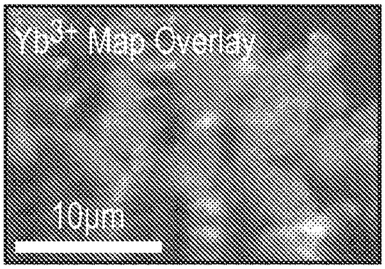
FIG. 1(G) show energy dispersive X-ray spectroscopy overlay of $Yb^{3+}$.

The morphology of the 5% $Yb^{3+}$:$CsPbCl_3$ powder was found to be composed of crystallites on the micrometer scale, as shown through scanning electron microscopy in FIG. 1(C). FIG. 1(C)) shows a scanning electron microscopy image of a 5% $Yb^{3+}$:$CsPbCl_3$ powder sample. The spatial distribution of CI, $Pb^{2+}$, $Cs^+$, and $Yb^{3+}$ are shown to cover the entirety of the powder crystallite in FIGS. 1(D)-1(G), as probed by energy dispersive X-ray spectroscopy. FIG. 1(D) shows an energy dispersive X-ray spectroscopy overlay of $Cl^-$. FIG. 1(E) shows an energy dispersive X-ray spectroscopy overlay of $Pb^{2+}$. FIG. 1(F) shows an energy dispersive X-ray spectroscopy overlay of $Cs^+$. FIG. 1(G) shows an energy dispersive X-ray spectroscopy overlay of $Yb^{3+}$, respectively.

There appears to be areas of higher concentration of $Cs^+$ and $Yb^{3+}$ on the crystallite, as observed in FIGS. 1(F)-1(G). This is possibly the result of incomplete mixing or slight aggregation, but regardless, these higher concentration areas remain well dispersed over the surface of the crystallite.

Optical Characterization

Figure 2A:
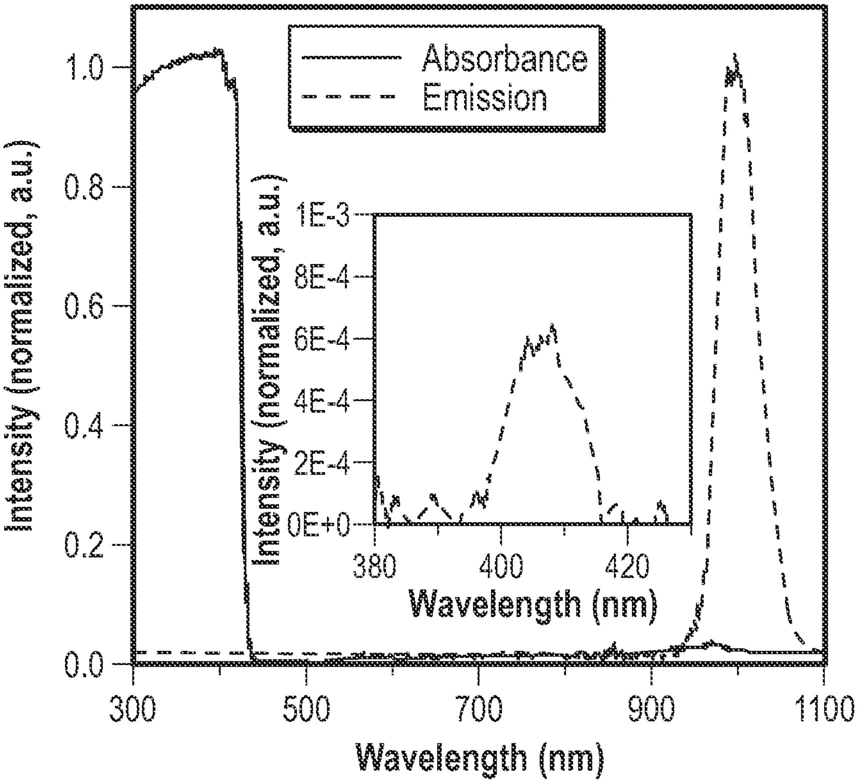
FIG. 2(A) graphically shows absorbance and photoluminescence of 5% $Yb^{3+}$:$CsPbCl_3$.
Figure 2B:
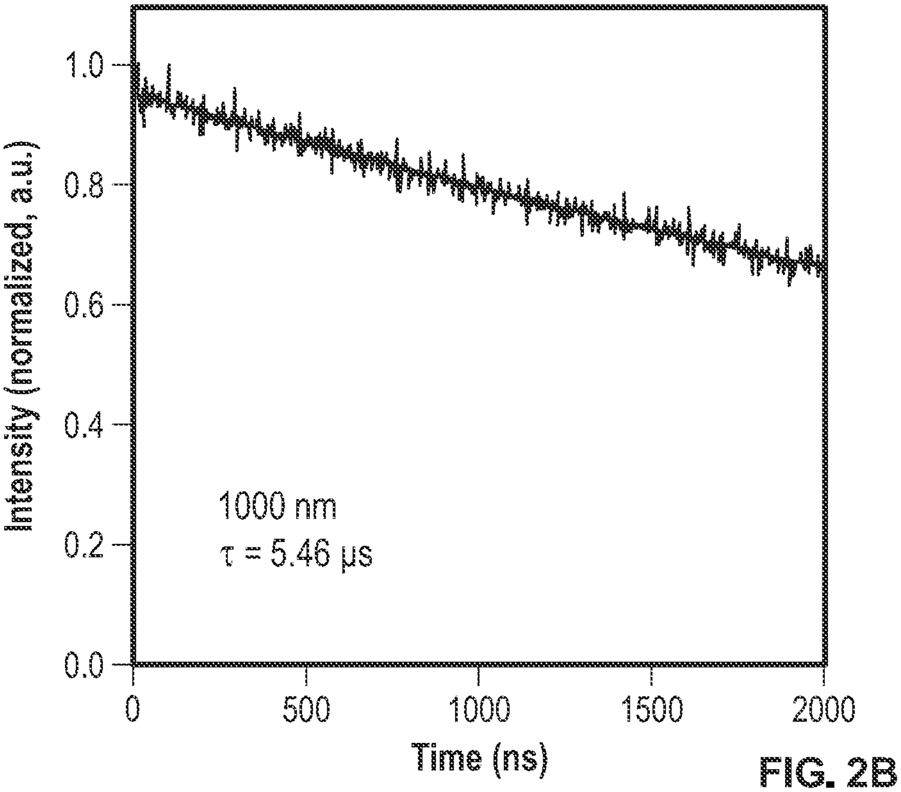
FIG. 2(B) graphically shows time resolved photoluminescence curve of 5% $Yb^{3+}$:$CsPbCl_3$ with monoexponential time decay (T) fit.

The 5% $Yb^{3+}$:$CsPbCl_3$ sample exhibits a large Stokes shift, as shown in FIG. 2, between the absorption onset at 440 nm, and the photoluminescent emission at 1,000 nm. FIG. 2(A) graphically shows the absorbance and photoluminescence of 5% $Yb^{3+}$:$CsPbCl_3$. FIG. 2(B) graphically shows the time resolved photoluminescence curve of 5% $Yb^{3+}$:$CsPbCl_3$ with monoexponential time decay (τ) fit. This shift prevents the re-absorption of emitted photons by the material, which is a property ideal for achieving high light yield in scintillation. The $CsPbCl_3$ excitonic emission at 406 nm is highly suppressed as a result of efficient sensitization of the $Yb^{3+}$ ion defect site. The 1,000 nm photoluminescence emission is characteristic of the $^2F_{5/2} \rightarrow {}^2F_{7/2}$ transition in $Yb^{3+}$ ion emission.

Radioluminescent Characterization

Figure 3A:
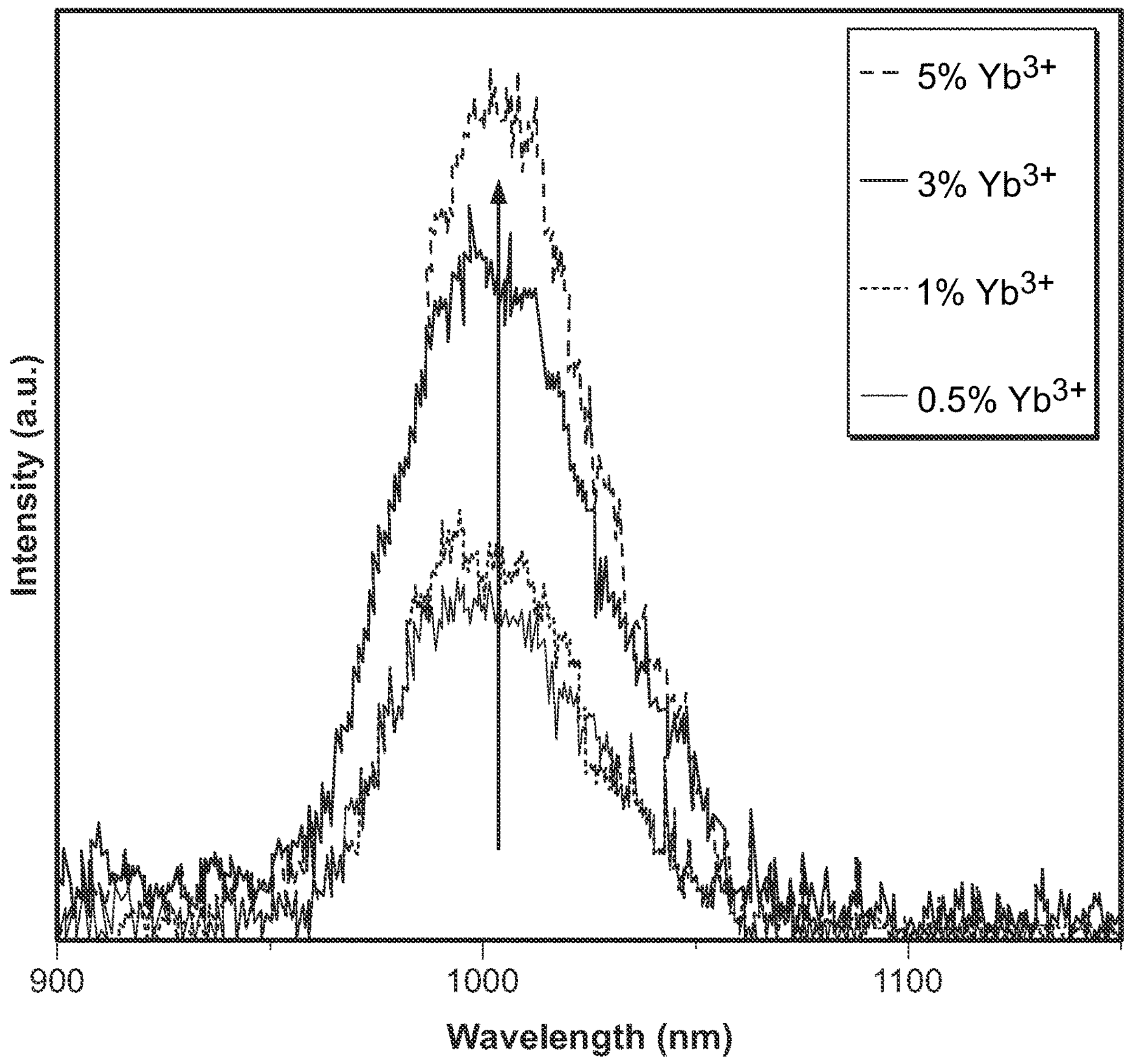
FIG. 3(A) graphically shows X-ray radioluminescence peaks of 0.5%-5% $Yb^{3+}$:$CsPbCl_3$.
Figure 3B:
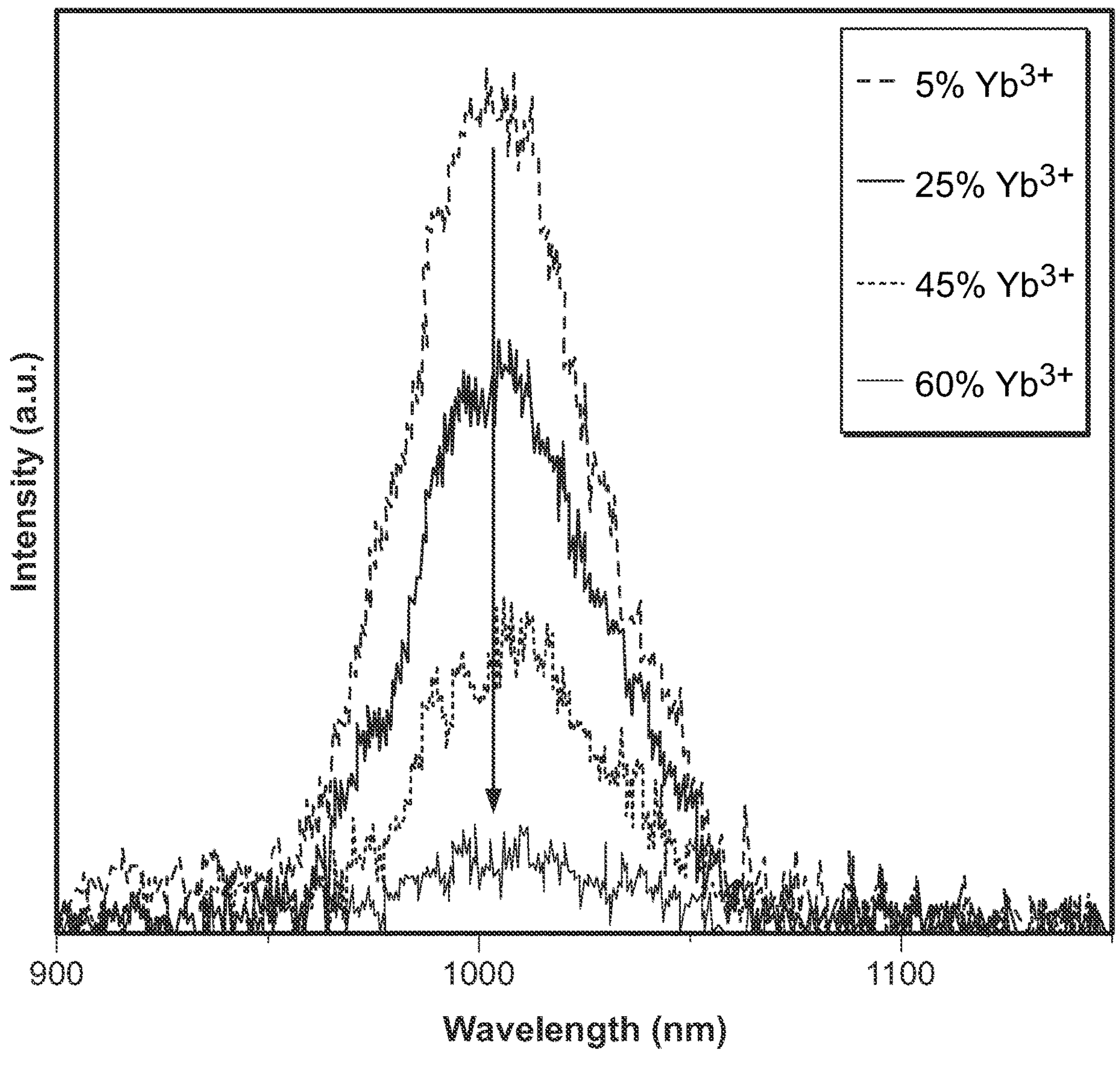
FIG. 3(B) graphically shows X-ray radioluminescence peaks of 5%-60% $Yb^{3+}$:$CsPbCl_3$.
Figure 3C:
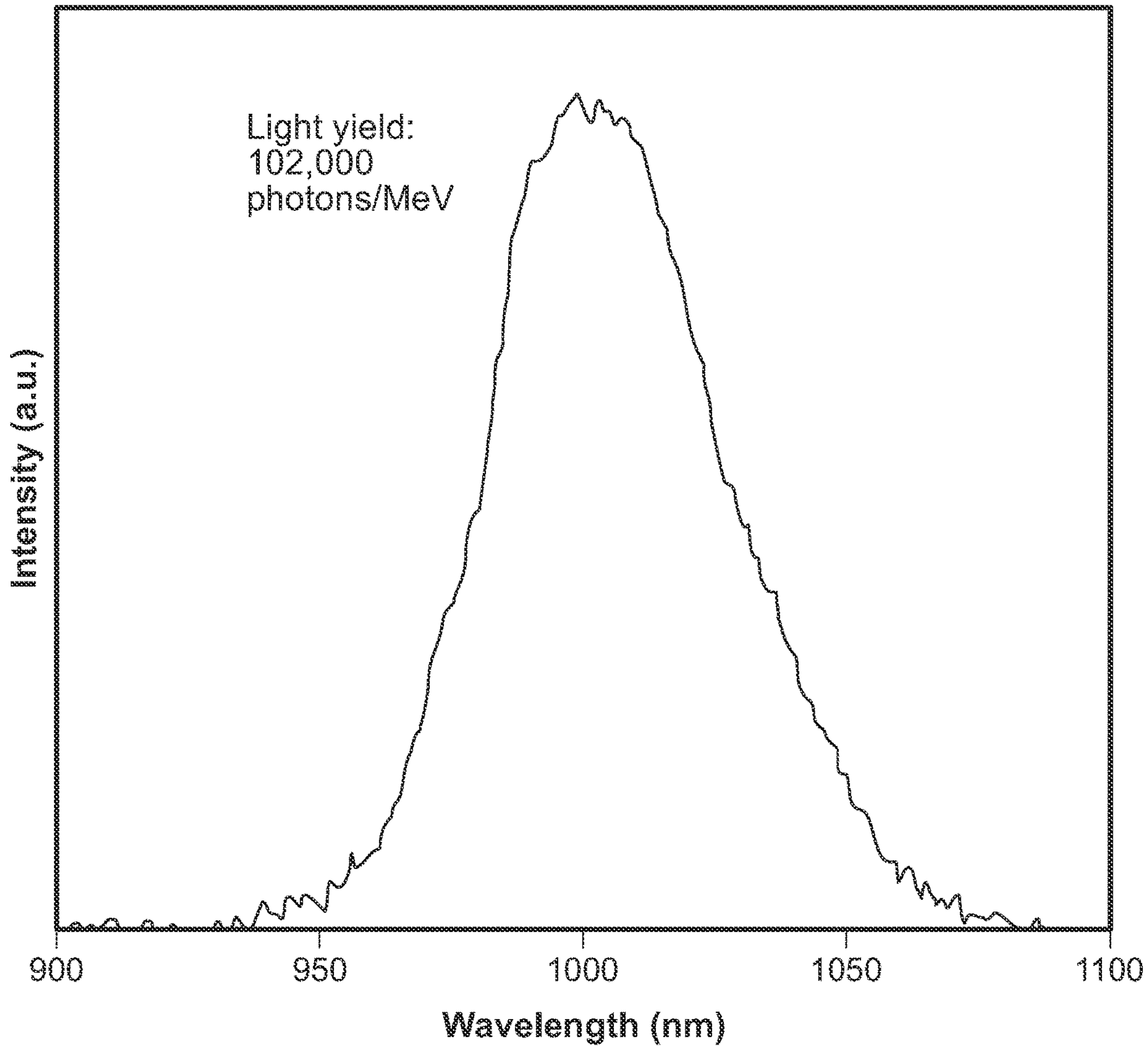
FIG. 3(C) graphically shows champion X-ray radioluminescence of 5% $Yb^{3+}$:$CsPbCl_3$ with light yield 102,000 photons/MeV.

Radioluminescence of the $Yb^{3+}$:$CsPbCl_3$ samples was detected using a Cu annode X-ray source operating at 40 kV and 300 μA, as shown in FIGS. 3(A)-3(C). FIG. 3(A) graphically shows the X-ray radioluminescence peaks of 0.5%-5% $Yb^{3+}$:$CsPbCl_3$. FIG. 3(B) graphically shows the X-ray radioluminescence peaks of 5%-60% $Yb^{3+}$:$CsPbCl_3$. FIG. 3(C) graphically shows the champion X-ray radioluminescence of 5% $Yb^{3+}$:$CsPbCl_3$ with light yield 102,000 photons/MeV. In FIG. 3(A), a trend of increasing radioluminescence intensity can be observed with increasing $Yb^{3+}$ ion content up to 5% $Yb^{3+}$:$CsPbCl_3$. This follows the conclusions of previous reports of $Yb^{3+}$ doped $CsPbX_3$, which found that increasing the $Yb^{3+}$ ion content at low concentrations increases the photoluminescent quantum yield, with our result indicating that this effect occurs in radioluminescence emission as well. In FIG. 3(B), the opposite effect can be observed, in which $Yb^{3+}$ ion concentrations above 5% result in a decrease of radioluminescence intensity. This is consistent with the X-ray diffraction results, wherein an increase in $Yb^{3+}$ ion content above 5% resulted in an increase of the formation of impurity species, which likely would not contribute to the radioluminescence emission. The light yield, a measure the number of photons emitted per unit energy of radiation absorbed, is a performance defining metric of a scintillator. In the champion 5% $Yb^{3+}$:$CsPbCl_3$ composition, the light yield was measured to be 102,000 photons/MeV, significantly higher than one of the brightest commercially available scintillators, CsI(Tl) with a light yield of 65,000 photons/MeV.

Figure 3D:
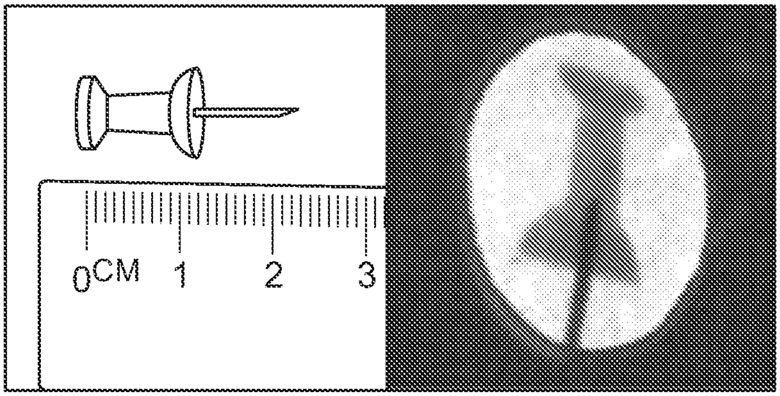
FIG. 3(D) shows an X-ray imaging on surface of 25 mm pressed 5% $Yb^{3+}$:$CsPbCl_3$ powder pellet of a thumbtack.
Figure 3E:
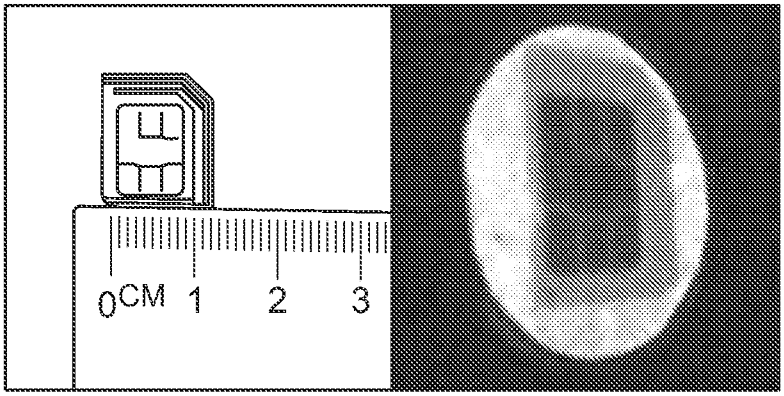
FIG. 3(E) shows an X-ray imaging on surface of 25 mm pressed 5% $Yb^{3+}$:$CsPbCl_3$ powder pellet of a micro-SIM card.

To determine the applicability of the $Yb^{3+}$:$CsPbCl_3$ powder prepared through the water-based solution method in radiographic imaging, the 5% $Yb^{3+}$:$CsPbCl_3$ sample was hydraulically pressed into a 25 mm pellet under 6 tons of pressure at 70° C. for 3 hours. Images captured by a Basler NIR GigE camera on the surface of the pressed powder pellet scintillator under 40 kV, 300 μA X-ray irradiation are shown in FIG. 3(D)-3(E). FIG. 3(D) shows an X-ray imaging on surface of 25 mm pressed 5% $Yb^{3+}$:$CsPbCl_3$ powder pellet of a thumbtack. FIG. 3(E) shows an X-ray imaging on surface of 25 mm pressed 5% $Yb^{3+}$:$CsPbCl_3$ powder pellet of a micro-SIM card. FIG. 3(D) shows a thumbtack in which the embedded metal pin is clearly visible through the plastic head. FIG. 3(E) shows a micro-SIM phone card in which the metal contact is differentiated from the plastic casing, and the sub-micrometer scale contact channels are visible. The ability of the $Yb^{3+}$:$CsPbCl_3$ pressed powder scintillator to capture these detailed images with such simple preparation methods highlights the potential of further refinement to produce even higher quality images with relative case.

Figure 4:
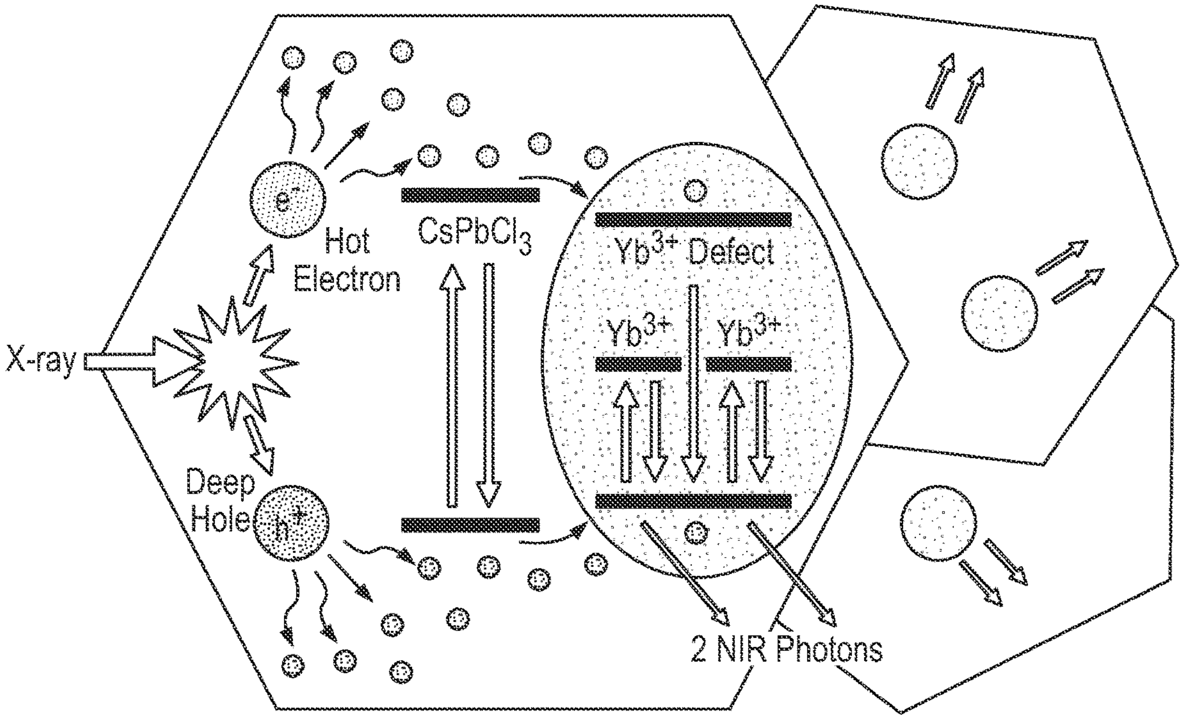
FIG. 4 schematically shows a visual abstract of $Yb^{3+}$:$CsPbCl_3$ powder utilizing the quantum cutting mechanism for X-ray scintillation.

FIG. 4 schematically shows a visual abstract of $Yb^{3+}$:$CsPbCl_3$ powder utilizing the quantum cutting mechanism for X-ray scintillation.

Figure 5:
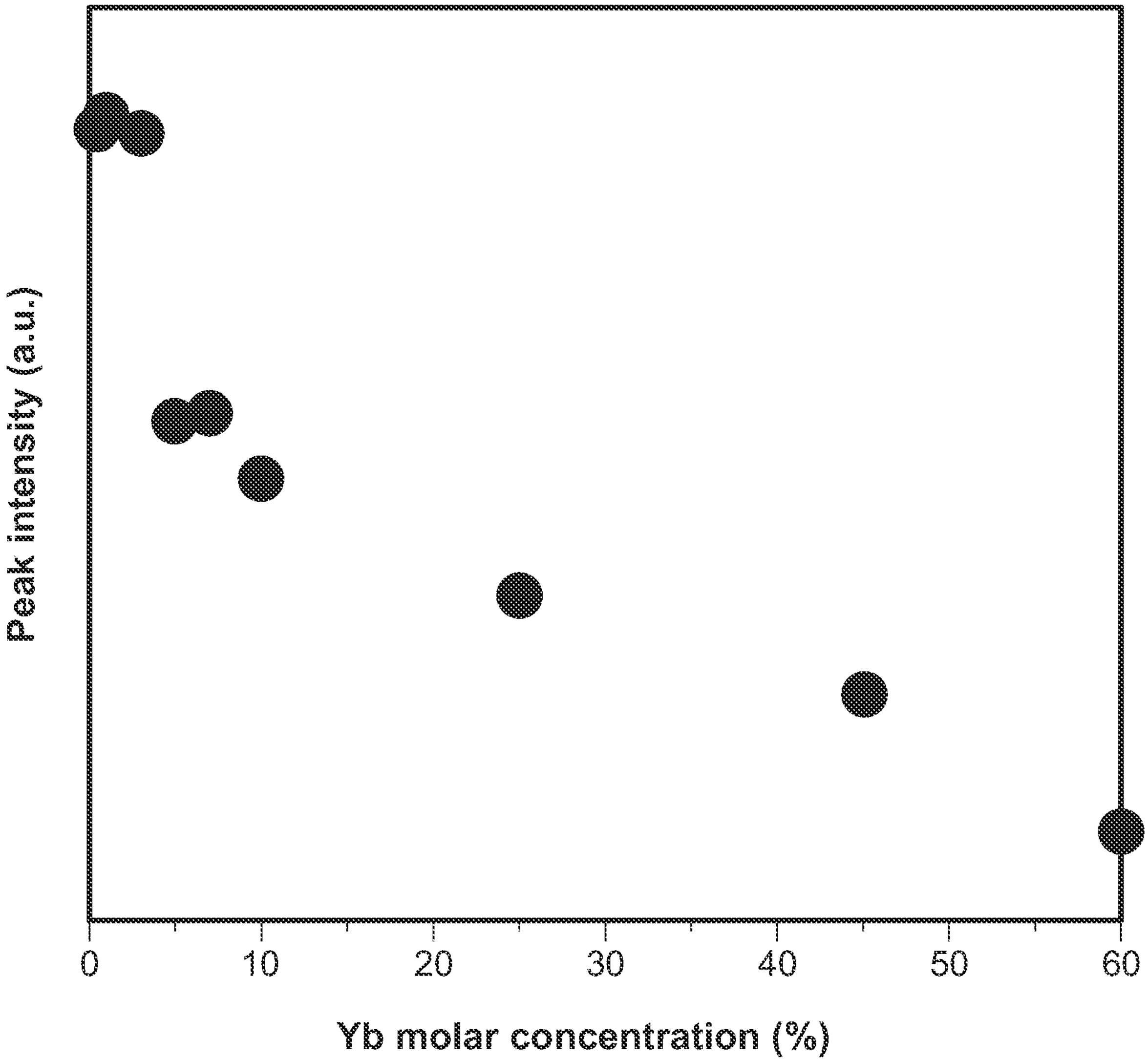
FIG. 5 graphically shows XRD (101) peak intensity of varying $Yb^{3+}$:$CsPbCl_3$ compositions comparing peak intensity (a.u.) to Yb molar concentration (%).

FIG. 5 graphically shows the XRD (101) peak intensity of varying $Yb^{3+}$:$CsPbCl_3$ compositions comparing peak intensity (a.u.) to Yb molar concentration (%).

Figure 6:
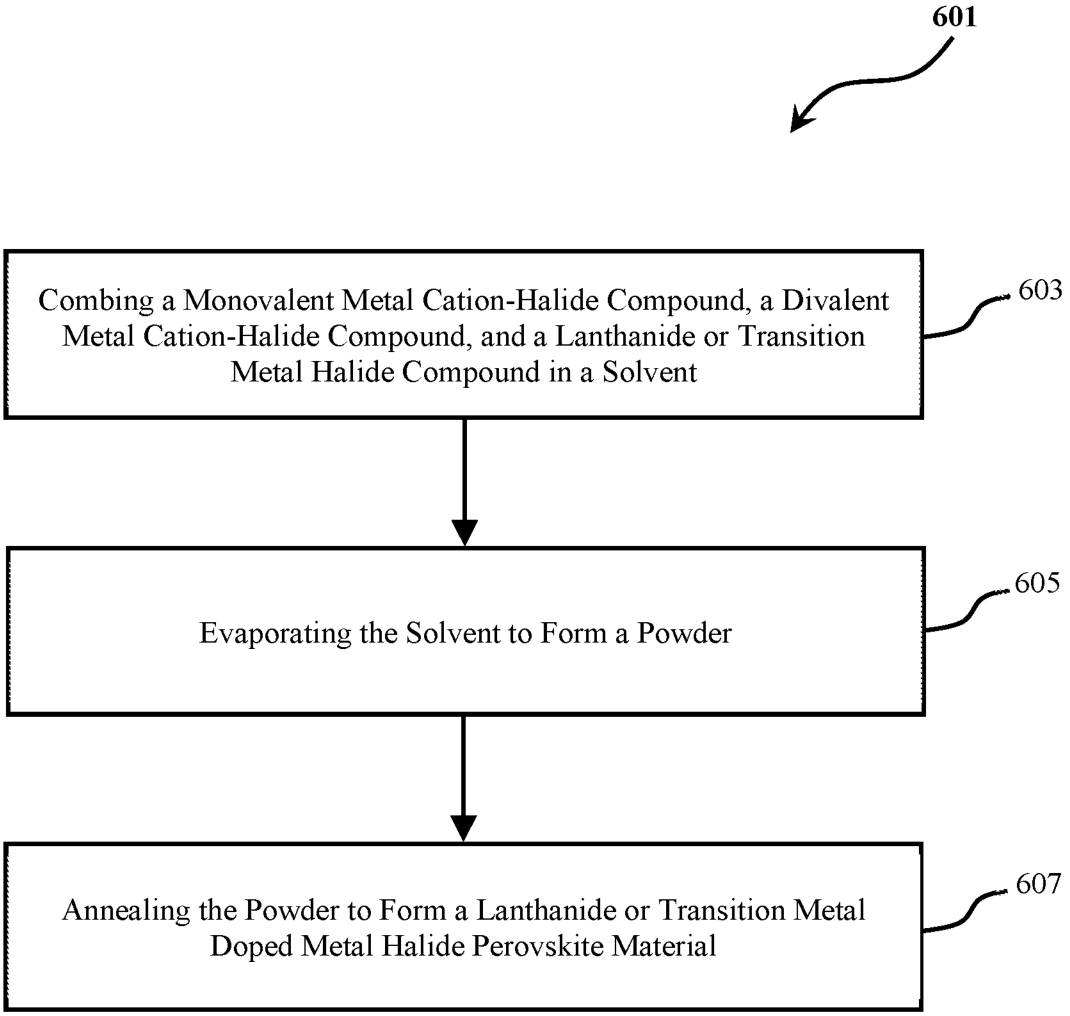
FIG. 6 shows a flow chart of a method of forming an embodiment of a doped metal halide perovskite according to an example

FIG. 6 shows a flow chart of an example method. FIG. 6 shows a flow chart of a method 601 of forming an embodiment of a doped metal halide according to an example. In operation 603, monovalent metal cation-halide compound, divalent metal cation-halide compound, and a lanthanide or transition metal halide compound are combined in a solvent. In operation 605, the solvent is evaporated to form a powder. In operation 607, the powder is annealed to form a lanthanide or transition metal a doped metal halide perovskite material.

Figure 7:
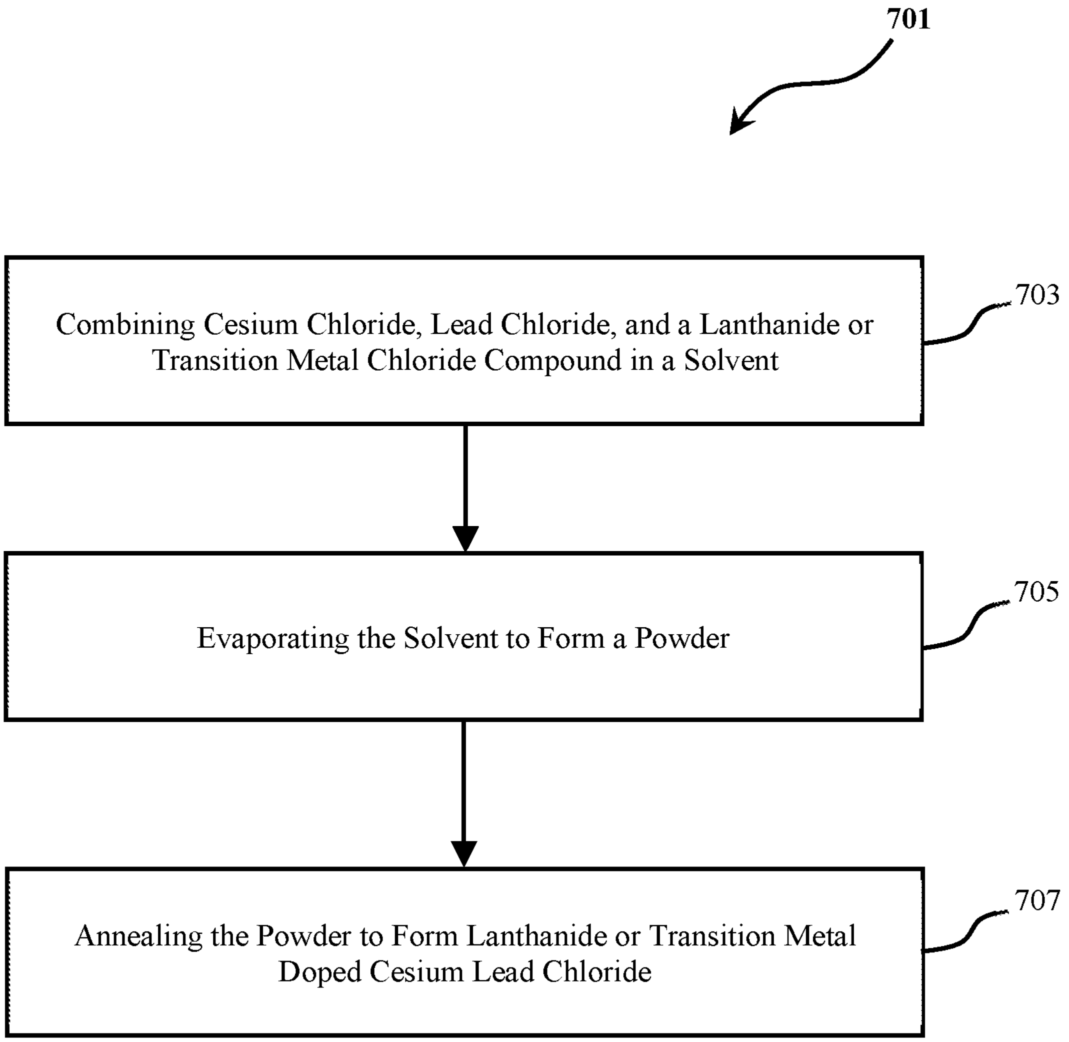
FIG. 7 shows a flow chart of a method of forming an embodiment of a doped cesium lead chloride according to an example.

FIG. 7 shows a flow chart of an example method. FIG. 7 shows a flow chart of a method 701 of forming an embodiment of a doped metal halide according to an example. In operation 703, a cesium chloride, lead chloride, and lanthanide or transition metal chloride compound are combined in a solvent. In operation 705, the solvent is evaporated to form a powder. In operation 707, the powder is annealed to form lanthanide or transition metal doped cesium lead chloride.

Figure 14:
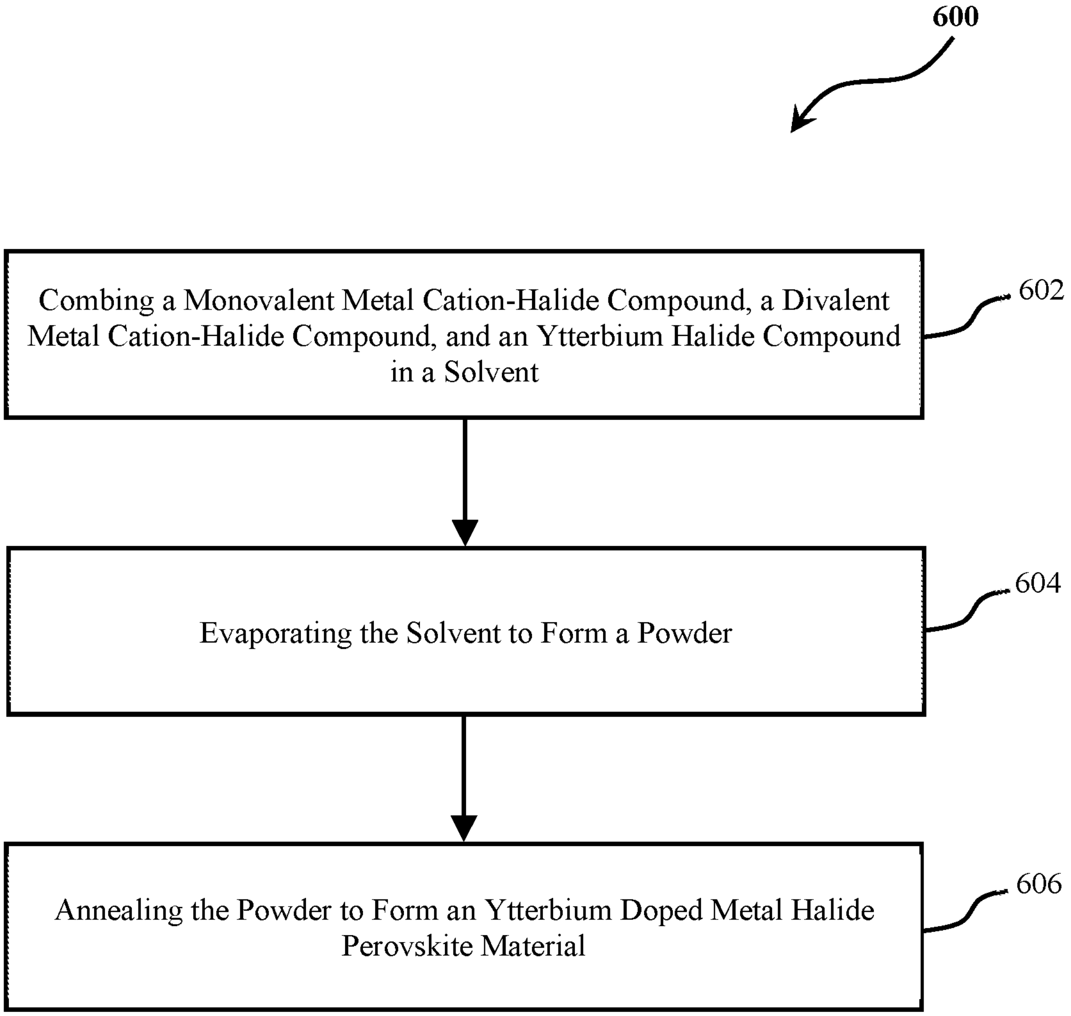
FIG. 14 shows a flow chart of a method of forming an embodiment of a doped metal halide perovskite according to an example.

FIG. 14 shows a flow chart of an example method. FIG. 14 shows a flow chart of a method 600 of forming an embodiment of a doped metal halide according to an example. In operation 602, monovalent metal cation-halide compound, divalent metal cation-halide compound, and ytterbium halide compound are combined in a solvent. In operation 604, the solvent is evaporated to form a powder. In operation 606, the powder is annealed to form an ytterbium doped metal halide perovskite material.

Figure 8:
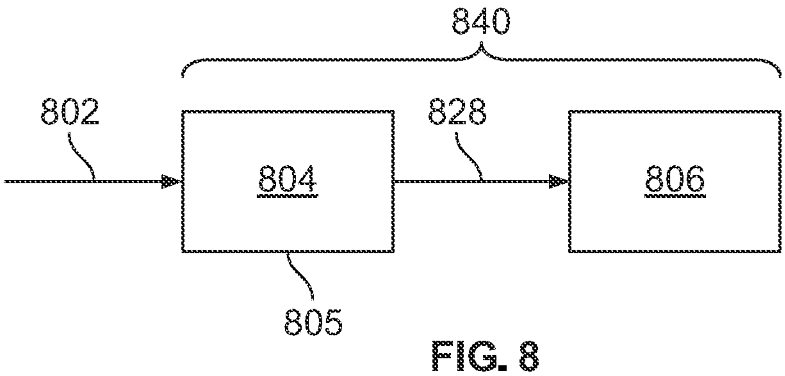
FIG. 8 schematically shows an embodiment of an ytterbium doped metal halide perovskite (YDMHP) material-based device.
Figure 15:
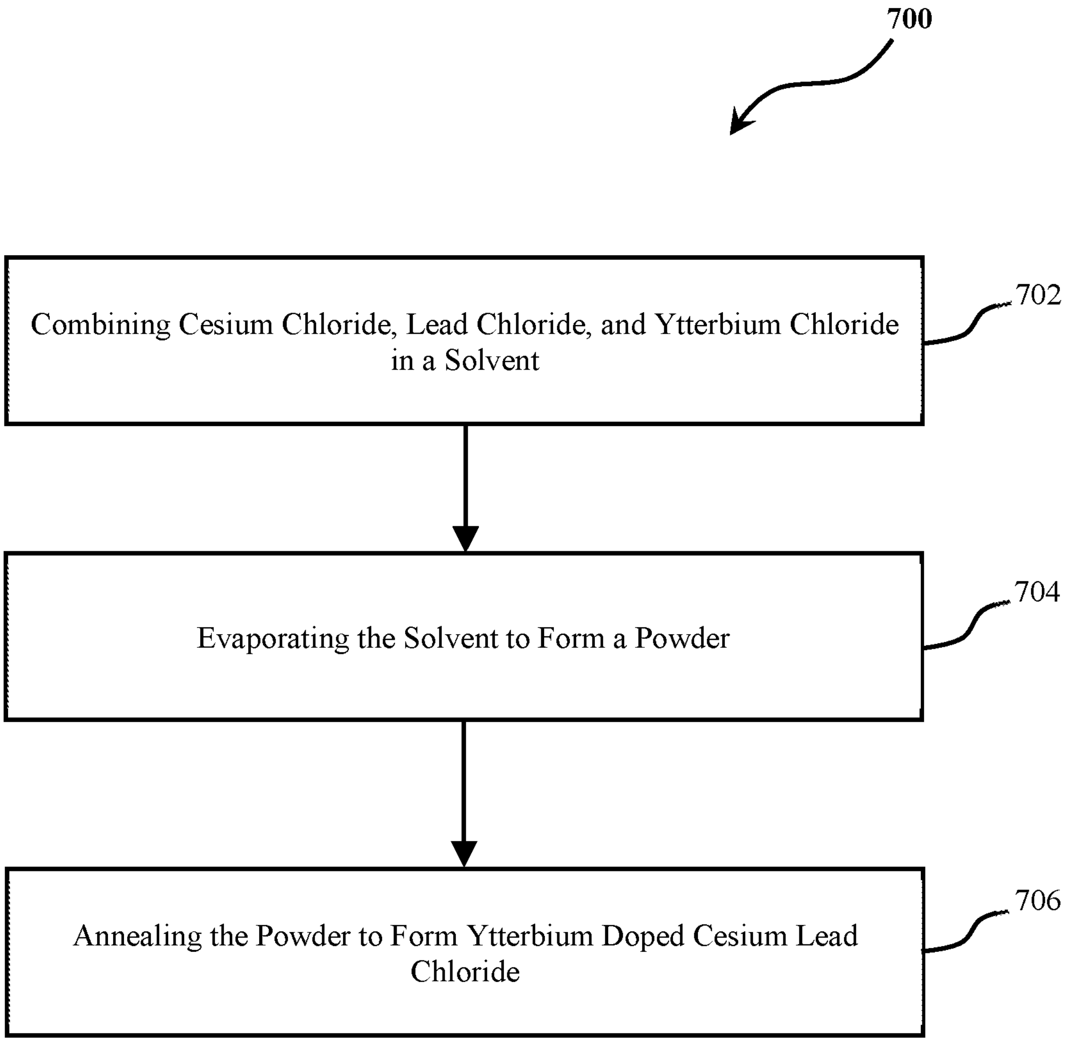
FIG. 15 shows a flow chart of a method of forming an embodiment of a doped cesium lead chloride according to an example.

FIG. 15 shows a flow chart of an example method. FIG. 15 shows a flow chart of a method 700 of forming an embodiment of a doped metal halide according to an example. In operation 702, cesium chloride, lead chloride, and ytterbium chloride are combined in a solvent. In operation 704, the solvent is evaporated to form a powder. In operation 706, the powder is annealed to form ytterbium doped cesium lead chloride. FIG. 8 schematically shows an embodiment of ytterbium doped metal halide perovskite (YDMHP) material-based device 840 having a receiver device 806 that is in electromagnetic communication 828 with an ytterbium doped metal halide perovskite (YDMHP) material 804. The YDMHP material 804 may be configured to be used as a scintillator device, scintillator region, scintillator component, scintillator layer, or scintillator module 805. The YDMHP material 804 and the scintillator device, scintillator region, scintillator component, scintillator layer, and scintillator module 805 are configured to receive emission 802. While ytterbium is discussed as being designated as the dopant in the ytterbium doped metal halide perovskite (YDMHP) material 804 of the doped MHP material-based device 840, in other embodiments other lanthanides may be used as the dopant rather than ytterbium. Moreover, rather than ytterbium, in other embodiments one of the transition metals may be used as the dopant instead of Ytterbium. Such Lanthanides that may be used include but are not limited to: $Ln^{2+}$, $Ce^{2+}$, $Pr^{2+}$, $Nd^{2+}$, $Pm^{2+}$, $Sm^{2+}$, $Eu^{2+}$, $Gd^{2+}$, $Tb^{2+}$, $Dy^{2+}$, $Ho^{2+}$, $Er^{2+}$, $Tm^{2+}$, $Yb^{2+}$, $Lu^{2+}$, $Ln^{3+}$, $Ce^{3+}$, $Pr^{3+}$, $Nd^{3+}$. $Pm^{3+}$, $Sm^{3+}$, $Eu^{3+}$, $Gd^{3+}$, $Tb^{3+}$, $Dy^{3+}$, $Ho^{3+}$, $Er^{3+}$, $Tm^{3+}$, $Yb^{3+}$, $Lu^{3+}$, $Ln^{4+}$, $Ce^{4+}$, $Pr^{4+}$, $Nd^{4+}$, $Pm^{4+}$, $Sm^{4+}$, $Eu^{4+}$, $Gd^{4+}$, $Tb^{4+}$, $Dy^{4+}$, $Ho^{4+}$, $Er^{4+}$, $Tm^{4+}$, $Yb^{4+}$, or $Lu^{4+}$. Such transition metals that may be used include but are not limited to all stable ions of: Ti, V, Cr, Mn, Fe, Co, Ni, Cu, Zn, Y, Zr, Nb, Mo, Tc, Ru, Rh, Pd, Ag, Cd, Hf, Ta, W, Re, Os, Ir, Pt, Au, Hg, Rf, Db, Sg, Bh, Hs, Mt, Ds, Rg, or Cn.

In other embodiments discussed herein the lanthanides and all stable ions of the transition metals discussed above may be used instead of ytterbium as the dopant in the MHP. The lanthanides and stable ions of the transition metals discussed as ytterbium substitutes for material 804 in FIG. 8 may similarly be substituted for ytterbium in the material The lanthanides and stable ions of the transition metals may be used as material 904 of FIG. 9, material 104 of FIG. 10, material 404 of FIG. 11, material 204 of FIG. 12, and material 304 of FIG. 13.

Figure 9:
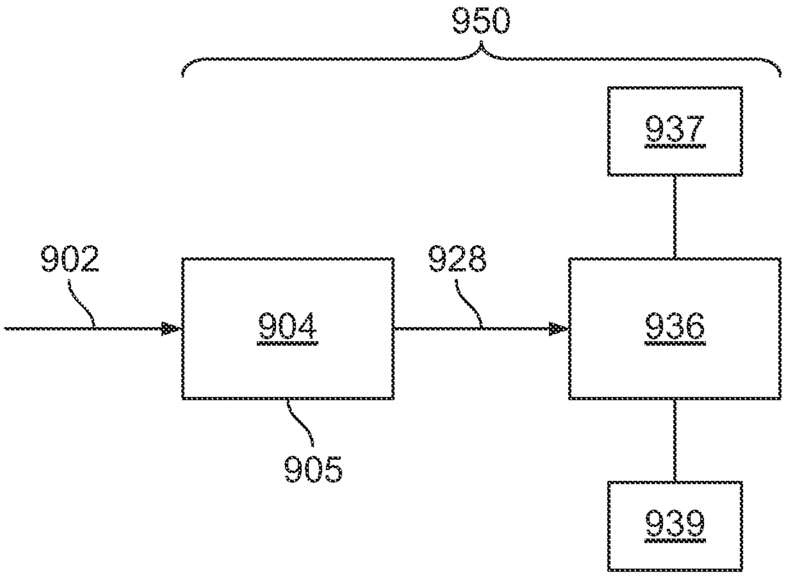
FIG. 9 schematically shows an embodiment of the photonic device.

FIG. 9 schematically shows an embodiment of the photonic device 950 having a semiconductor device 936 directly or indirectly coupled to a first electrode 937 and second electrode 939 wherein the semiconductor device 936, the first electrode 937, and the second electrode 939 are in electromagnetic communication 928 with an ytterbium doped metal halide perovskite (YDMHP) material 904. The YDMHP material 904 may be configured to be used as a scintillator device, scintillator region, scintillator component, scintillator layer, or scintillator module 905. The YDMHP material 904 and the scintillator device, scintillator region, scintillator component, scintillator layer, and scintillator module 905 are configured to receive emission 902. The ytterbium doped metal halide perovskite (YDMHP) material 904 may instead be doped with any stable lanthanide or transition metal ion mentioned above.

Still referring to FIG. 9, in some embodiments, the semiconductor device 936, the first electrode 937, and the second electrode 939, and the scintillator device, scintillator region, scintillator component, scintillator layer, and scintillator module 905 are configured wherein the photonic device 950 is any one or more of the following: a) one or more photovoltaic (PV) devices, and optionally, the one or more photovoltaic (PV) devices are solar cells; b) one or more photodetectors; c) one or more light emitting diodes (LEDs); d) one or more laser Diodes (LDs); e) one or luminescent solar concentrators; or f) one or more nuclear batteries. Further, the photodetector may be configured to be any one of the following: micro photomultiplier, photodiode, or silicon photomultiplier.

Figure 10:
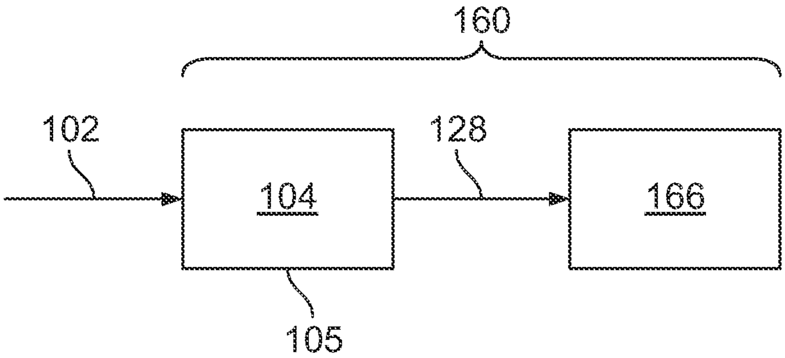
FIG. 10 schematically shows an embodiment of the photonic device.

FIG. 10 schematically shows an embodiment of the photonic device 160 having a photomultiplier tube (PMT) 166 wherein the photomultiplier tube (PMT) 166 is in electromagnetic communication 128 with an ytterbium doped metal halide perovskite (YDMHP) material 104. The YDMHP material 104 may be configured to be used as a scintillator device, scintillator region, scintillator component, scintillator layer, or scintillator module 905. The YDMHP material 104 and the scintillator device, scintillator region, scintillator component, scintillator layer, and scintillator module 905 are configured to receive emission 102. The ytterbium doped metal halide perovskite (YDMHP) material 104 may instead be doped with any stable lanthanide or transition metal ion mentioned above.

Figure 11:
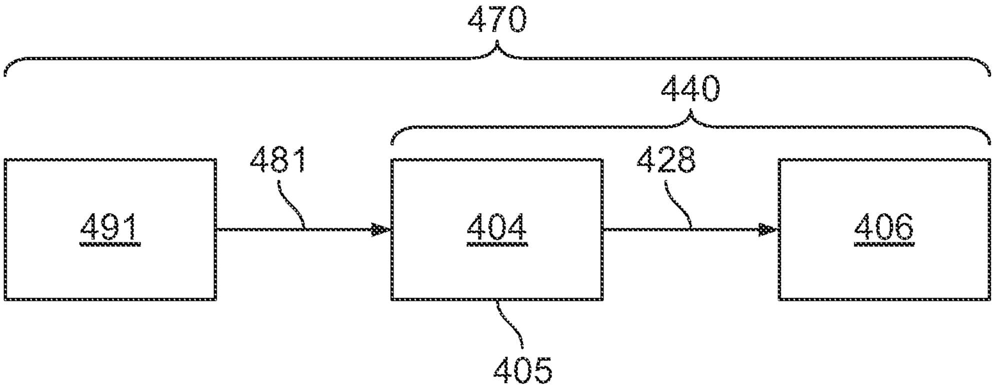
FIG. 11 schematically shows an embodiment of a power source device 470 that is based on an ytterbium doped metal halide perovskite (YDMHP) material-based device.

FIG. 11 schematically shows an embodiment of a power source device 470 that is based on an ytterbium doped metal halide perovskite (YDMHP) material-based device 440 having a receiver device 406 that is in electromagnetic communication 428 with an ytterbium doped metal halide perovskite (YDMHP) material 404. The YDMHP material 404 may be configured to be used as a scintillator device, scintillator region, scintillator component, scintillator layer, or scintillator module 405. The YDMHP material 404 and the scintillator device, scintillator region, scintillator component, scintillator layer, and scintillator module 405 are configured to be in emission communication 481 with an emission source 491. In an embodiment, the emission source 491 may be any one of the following: alpha emission, beta emission, gamma radiation, or x-ray radiation. The ytterbium doped metal halide perovskite (YDMHP) material 404 may instead be doped with any stable lanthanide or transition metal ion mentioned above.

Figure 12:
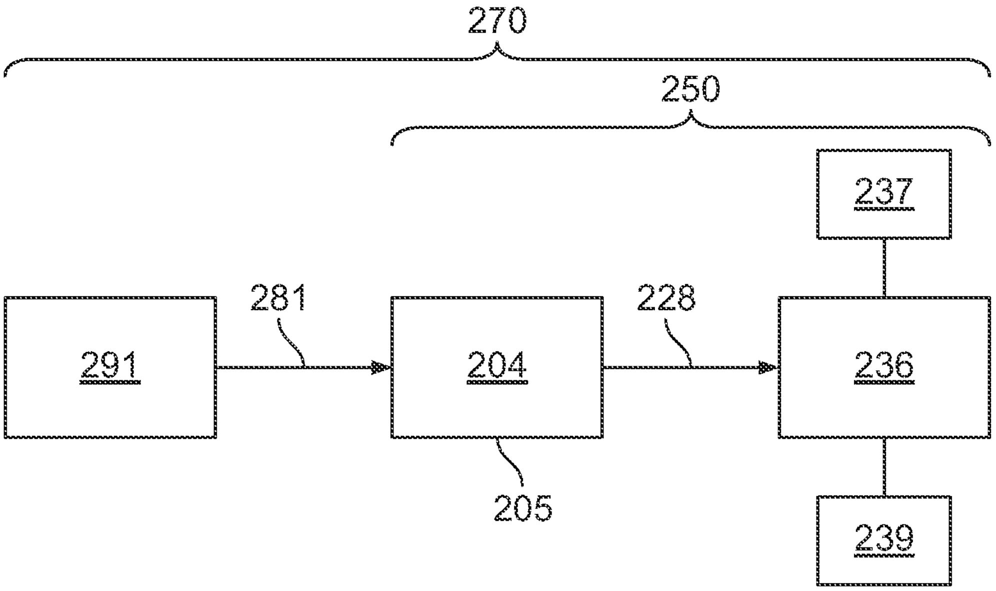
FIG. 12 schematically shows an embodiment of a power source device.

FIG. 12 schematically shows an embodiment of a power source device 270 with an embodiment of the photonic device 250 having a semiconductor device 236 directly or indirectly coupled to a first electrode 237 and second electrode 239 wherein the semiconductor device 236, the first electrode 237, and the second electrode 239 are in electromagnetic communication 228 with an ytterbium doped metal halide perovskite (YDMHP) material 904. The YDMHP material 204 may be configured to be used as a scintillator device, scintillator region, scintillator component, scintillator layer, or scintillator module 205. The YDMHP material 204 and the scintillator device, scintillator region, scintillator component, scintillator layer, and scintillator module 205 are configured to be in emission communication 281 with an emission source 291. In an embodiment, the emission source 291 may be any one of the following: alpha emission, beta emission, gamma radiation, or x-ray radiation. The ytterbium doped metal halide perovskite (YDMHP) material 204 may instead be doped with any stable lanthanide or transition metal ion mentioned above.

Still referring to FIG. 12, in some embodiments, the semiconductor device 236, the first electrode 237, and the second electrode 239, and the scintillator device, scintillator region, scintillator component, scintillator layer, and scintillator module 205 are configured wherein the photonic device 250 is any one of the following: a) one or more photovoltaic (PV) devices, and optionally, the one or more photovoltaic (PV) devices are solar cells; b) one or more photodetectors; c) one or more light emitting diodes (LEDs); d) one or more laser Diodes (LDs); e) one or luminescent solar concentrators; or f) one or more nuclear batteries. Further, the photodetector may be configured to be any one or more of the following: micro photomultiplier, photodiode, or silicon photomultiplier.

Figure 13:
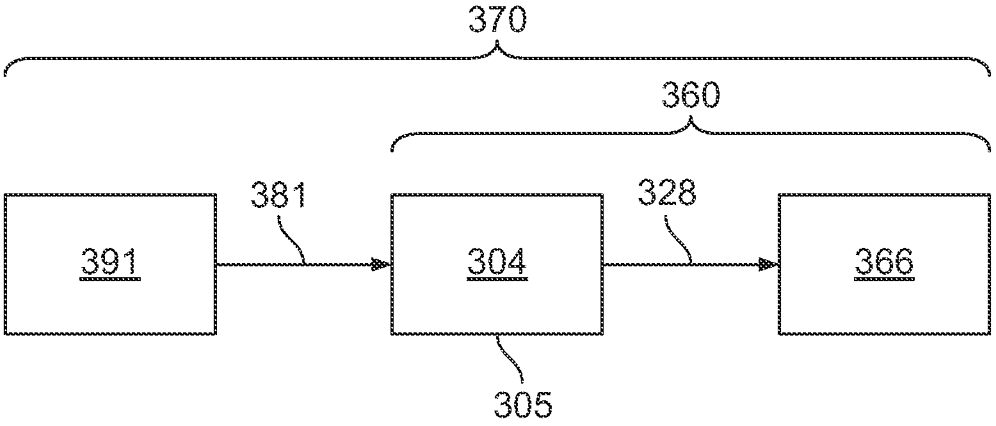
FIG. 13 schematically shows an embodiment of a power source device.

FIG. 13 schematically shows an embodiment of a power source device 370 with an embodiment of the photonic device 360 having a photomultiplier tube (PMT) 366 wherein the photomultiplier tube (PMT) 366 is in electromagnetic communication 328 with an ytterbium doped metal halide perovskite (YDMHP) material 304. The YDMHP material 304 may be configured to be used as a scintillator device, scintillator region, scintillator component, scintillator layer, or scintillator module 305. The YDMHP material 304 and the scintillator device, scintillator region, scintillator component, scintillator layer, and scintillator module 305 are configured to be in emission communication 381 with an emission source 391. In an embodiment, the emission source 391 may be any one of the following: alpha emission, beta emission, gamma radiation, or x-ray radiation. The ytterbium doped metal halide perovskite (YDMHP) material 304 may instead be doped with any stable lanthanide or transition metal ion mentioned above.

CONCLUSIONS

In summary, we have shown the first detection and application of radioluminescence in an $Yb^{3+}$ doped cesium lead halide. Our water-based synthesis method produces $Yb^{3+}$:$CsPbCl_3$ powder over a wide composition range that shows incorporation of the $Yb^{3+}$ dopant with high purity up to a maximum of 5 mol %. The water evaporation and low temperature annealing method presented here is among the simplest methods of producing $Yb^{3+}$:$CsPbX_3$, but does not sacrifice the crystallinity of the $CsPbCl_3$ host lattice. The 5% $Yb^{3+}$:$CsPbCl_3$ sample has a large Stokes shift, and the strong characteristic $Yb^{3+}$ emission at 1,000 nm. Suppressed $CsPbCl_3$ excitonic emission at 406 nm proves efficient transfer of charge carriers from the bulk lattice to the defect $Yb^{3+}$ emission sites. Radioluminescence is exhibited by all $Yb^{3+}$:$CsPbCl_3$ samples, and is optimized at 5 mol % due to a balance of high $Yb^{3+}$ ion content and high material purity. The champion 5% $Yb^{3+}$:$CsPbCl_3$ composition has a measured light yield of 102,000 photons/MeV, making it higher performance than the brightest commercial scintillator options. Successful radiographic imaging was conducted using a pressed powder pellet. The simple preparation method combined with high scintillation performance of the $Yb^{3+}$:$CsPbCl_3$ powders presented in this work indicate the promise of $Yb^{3+}$ doped perovskites in future detection applications. Although Yb is used as an example dopant, the invention is not so limited. Other dopants are within the scope of the invention. Although $CsPbCl_3$ is used as an example metal halide perovskite, the invention is not so limited. Other metal halide perovskite materials are within the scope of the invention.

For instance, other metal halide perovskites (MHP) could be made and doped with ytterbium within the context of the embodiments of the invention, in addition to $CsPbCl_3$ (cesium lead chloride). Such compounds which are to be included within the context of the embodiments of the invention would include, for example but not limited thereto: $LiCaCl_3$ (Lithium Calcium chloride), $KMgBr_3$ (potassium magnesium bromide), $NaBiI_3$ (sodium bismuth Iodide), $CsSnI_3$ (cesium tin Iodide), $LiPbBr_3$ (lithium lead bromide), and other compounds of the like which follow the general formula outlined in embodiments disclosed herein (i.e., any compound taking the formula $ABX_3$ where A is a monovalent metal cation, B is a divalent metal cation, and X is a halide).

For example, but not limited thereto, monovalent metal cations may include, but not limited thereto:

$Li^+$, $Na^+$, $K^+$, $Rb^+$, $Cs^+$, $Sc^+$, $Ti^+$, $V^+$, $Cr^+$, $Mn^+$, $Fe^+$, $Co^+$, $Ni^+$, $Cu^+$, $Zn^+$, $Ga^+$, $Ge^+$, $As^+$, $Se^+$, $Bi^+$

For example, but not limited thereto, divalent metal cations, may include, but not limited thereto:

$Be^{2+}$, $Mg^{2+}$, $Ca^{2+}$, $Sr^{2+}$, $Ba^{2+}$, $Ra^{2+}$, $Sc^{2+}$, $Ti^{2+}$, $V^{2+}$, $Cr^{2+}$, $Mn^{2+}$, $Fe^{2+}$, $Sn^{2+}$, $Co^{2+}$, $Ni^{2+}$, $Cu^{2+}$, $Zn^{2+}$, $Ga^{2+}$, $Ge^{2+}$, $As^{2+}$, $Se^{2+}$, $Pb^{2+}$

For example, but not limited thereto, halides, may include, but not limited thereto:

$F^-$, $Cl^-$, $Br^-$, $I^-$

Below are some examples of metal halide perovskites (MHP) which could be used in the present invention. These examples were taken by combining the example above lists (i.e., such as listing of the example monovalent metal cations, divalent metal cations, and Halides) according to the given formula $ABX_3$, where A is a monovalent metal cation, B is a divalent metal cation, and X is a halide. The below list of MHP examples is not exhaustive and metal halide perovskites not included in the below list may still be used in aspects of embodiments of the present invention.

MHP Examples $LiBeF_3$, $LiBeCl_3$, $LiBeBr_3$, $LiBeI_3$, $LiMgF_3$, $LiMgCl_3$, $LiMgBr_3$, $LiMgI_3$, $LiCaF_3$, $LiCaCl_3$, $LiCaBr_3$, $LiCaI_3$, $LiSrF_3$, $LiSrCl_3$, $LiSrBr_3$, $LiSrI_3$, $LiBaF_3$, $LiBaCl_3$, $LiBaBr_3$, $LiBaI_3$, $LiRaF_3$, $LiRaCl_3$, $LiRaBr_3$, $LiRaI_3$, $LiScF_3$, $LiScCl_3$, $LiScBr_3$, $LiScI_3$, $LiTiF_3$, $LiTiCl_3$, $LiTiBr_3$, $LiTiI_3$, $LiVF_3$, $LiVCl_3$, $LiVBr_3$, $LiVI_3$, $LiCrF_3$, $LiCrCl_3$, $LiCrBr_3$, $LiCrI_3$, $LiMnF_3$, $LiMnCl_3$, $LiMnBr_3$, $LiMnI_3$, $LiFeF_3$, $LiFeCl_3$, $LiFeBr_3$, $LiFeI_3$, $LiCoF_3$, $LiCoCl_3$, $LiCoBr_3$, $LiCoI_3$, $LiNiF_3$, $LiNiCl_3$, $LiNiBr_3$, $LiNiI_3$, $LiCuF_3$, $LiCuCl_3$, $LiCuBr_3$, $LiCuI_3$, $LiZnF_3$, $LiZnCl_3$, $LiZnBr_3$, $LiZnI_3$, $LiGaF_3$, $LiGaCl_3$, $LiGaBr_3$, $LiGaI_3$, $LiGeF_3$, $LiGeCl_3$, $LiGeBr_3$, $LiGeI_3$, $LiAsF_3$, $LiAsCl_3$, $LiAsBr_3$, $LiAsI_3$, $LiScF_3$, $LiSeCl_3$, $LiSeBr_3$, $LiSeI_3$, $LiPbF_3$, $LiPbCl_3$, $LiPbBr_3$, $LiPbI_3$, $NaBeF_3$, $NaBeCl_3$, $NaBeBr_3$, $NaBcI_3$, $NaMgF_3$, $NaMgCl_3$, $NaMgBr_3$, $NaMgI_3$, $NaCaF_3$, $NaCaCl_3$, $NaCaBr_3$, $NaCaI_3$, $NaSrF_3$, $NaSrCl_3$, $NaSrBr_3$, $NaSrI_3$, $NaBaF_3$, $NaBaCl_3$, $NaBaBr_3$, $NaBaI_3$, $NaRaF_3$, $NaRaCl_3$, $NaRaBr_3$, $NaRaI_3$, $NaScF_3$, $NaScCl_3$, $NaScBr_3$, $NaScI_3$, $NaTiF_3$, $NaTiCl_3$, $NaTiBr_3$, $NaTiI_3$, $NaVF_3$, $NaVCl_3$, $NaVBr_3$, $NaVI_3$, $NaCrF_3$, $NaCrCl_3$, $NaCrBr_3$, $NaCrI_3$, $NaMnF_3$, $NaMnCl_3$, $NaMnBr_3$, $NaMnI_3$, $NaFeF_3$, $NaFeCl_3$, $NaFeBr_3$, $NaFeI_3$, $NaCoF_3$, $NaCoCl_3$, $NaCoBr_3$, $NaCoI_3$, $NaNiF_3$, $NaNiCl_3$, $NaNiBr_3$, $NaNiI_3$, $NaCuF_3$, $NaCuCl_3$, $NaCuBr_3$, $NaCuI_3$, $NaZnF_3$, $NaZnCl_3$, $NaZnBr_3$, $NaZnI_3$, $NaGaF_3$, $NaGaCl_3$, $NaGaBr_3$, $NaGaI_3$, $NaGeF_3$, $NaGeCl_3$, $NaGeBr_3$, $NaGeI_3$, $NaAsF_3$, $NaAsCl_3$, $NaAsBr_3$, $NaAsI_3$, $NaScF_3$, $NaScCl_3$, $NaScBr_3$, $NaScI_3$, $NaPbF_3$, $NaPbCl_3$, $NaPbBr_3$, $NaPbI_3$, $KBeF_3$, $KBeCl_3$, $KBeBr_3$, $KBeI_3$, $KMgF_3$, $KMgCl_3$, $KMgBr_3$, $KMgI_3$, $KCaF_3$, $KCaCl_3$, $KCaBr_3$, $KCaI_3$, $KSrF_3$, $KSrCl_3$, $KSrBr_3$, $KSrI_3$, $KBaF_3$, $KBaCl_3$, $KBaBr_3$, $KBaI_3$, $KRaF_3$, $KRaCl_3$, $KRaBr_3$, $KRaI_3$, $KSeF_3$, $KSeCl_3$, $KSeBr_3$, $KSeI_3$, $KTiF_3$, $KTiCl_3$, $KTiBr_3$, $KTiI_3$, $KVF_3$, $KVCl_3$, $KVBr_3$, $KVI_3$, $KCrF_3$, $KCrCl_3$, $KCrBr_3$, $KCrI_3$, $KMnF_3$, $KMnCl_3$, $KMnBr_3$, $KMnI_3$, $KFeF_3$, $KFeCl_3$, $KFeBr_3$, $KFeI_3$, $KCoF_3$, $KCoCl_3$, $KCoBr_3$, $KCoI_3$, $KNiF_3$, $KNiCl_3$, $KNiBr_3$, $KNiI_3$, $KCuF_3$, $KCuCl_3$, $KCuBr_3$, $KCuI_3$, $KZnF_3$, $KZnCl_3$, $KZnBr_3$, $KZnI_3$, $KGaF_3$, $KGaCl_3$, $KGaBr_3$, $KGaI_3$, $KGeF_3$, $KGeCl_3$, $KGeBr_3$, $KGeI_3$, $KAsF_3$, $KAsCl_3$, $KAsBr_3$, $KAsI_3$, $KSeF_3$, $KSeCl_3$, $KSeBr_3$, $KSeI_3$, $KPbF_3$, $KPbCl_3$, $KPbBr_3$, $KPbI_3$, $RbBeF_3$, $RbBeCl_3$, $RbBeBr_3$, $RbBeI_3$, $RbMgF_3$, $RbMgCl_3$, $RbMgBr_3$, $RbMgI_3$, $RbCaF_3$, $RbCaCl_3$, $RbCaBr_3$, $RbCaI_3$, $RbSrF_3$, $RbSrCl_3$, $RbSrBr_3$, $RbSrI_3$, $RbBaF_3$, $RbBaCl_3$, $RbBaBr_3$, $RbBaI_3$, $RbRaF_3$, $RbRaCl_3$, $RbRaBr_3$, $RbRaI_3$, $RbSeF_3$, $RbSeCl_3$, $RbSeBr_3$, $RbSeI_3$, $RbTiF_3$, $RbTiCl_3$, $RbTiBr_3$, $RbTiI_3$, $RbVF_3$, $RbVCl_3$, $RbVBr_3$, $RbVI_3$, $RbCrF_3$, $RbCrCl_3$, $RbCrBr_3$, $RbCrI_3$, $RbMnF_3$, $RbMnCl_3$, $RbMnBr_3$, $RbMnI_3$, $RbFeF_3$, $RbFeCl_3$, $RbFeBr_3$, $RbFeI_3$, $RbCoF_3$, $RbCoCl_3$, $RbCoBr_3$, $RbCoI_3$, $RbNiF_3$, $RbNiCl_3$, $RbNiBr_3$, $RbNiI_3$, $RbCuF_3$, $RbCuCl_3$, $RbCuBr_3$, $RbCuI_3$, $RbZnF_3$, $RbZnCl_3$, $RbZnBr_3$, $RbZnI_3$, $RbGaF_3$, $RbGaCl_3$, $RbGaBr_3$, $RbGaI_3$, $RbGeF_3$, $RbGeCl_3$, $RbGeBr_3$, $RbGeI_3$, $RbAsF_3$, $RbAsCl_3$, $RbAsBr_3$, $RbAsI_3$, $RbSeF_3$, $RbSeCl_3$, $RbSeBr_3$, $RbSeI_3$, $RbPbF_3$, $RbPbCl_3$, $RbPbBr_3$, $RbPbI_3$, $CsBeF_3$, $CsBeCl_3$, $CsBeBr_3$, $CsBeI_3$, $CsMgF_3$, $CsMgCl_3$, $CsMgBr_3$, $CsMgI_3$, $CsCaF_3$, $CsCaCl_3$, $CsCaBr_3$, $CsCaI_3$, $CsSrF_3$, $CsSrCl_3$, $CsSrBr_3$, $CsSrI_3$, $CsBaF_3$, $CsBaCl_3$, $CsBaBr_3$, $CsBaI_3$, $CsRaF_3$, $CsRaCl_3$, $CsRaBr_3$, $CsRaI_3$, $CsScF_3$, $CsScCl_3$, $CsScBr_3$, $CsScI_3$, $CsTiF_3$, $CsTiCl_3$, $CsTiBr_3$, $CsTiI_3$, $CsVF_3$, $CsVCl_3$, $CsVBr_3$, $CsVI_3$, $CsCrF_3$, $CsCrCl_3$, $CsCrBr_3$, $CsCrI_3$, $CsMnF_3$, $CsMnCl_3$, $CsMnBr_3$, $CsMnI_3$, $CsFeF_3$, $CsFeCl_3$, $CsFeBr_3$, $CsFeI_3$, $CsCoF_3$, $CsCoCl_3$, $CsCoBr_3$, $CsCoI_3$, $CsNiF_3$, $CsNiCl_3$, $CsNiBr_3$, $CsNiI_3$, $CsCuF_3$, $CsCuCl_3$, $CsCuBr_3$, $CsCuI_3$, $CsZnF_3$, $CsZnCl_3$, $CsZnBr_3$, $CsZnI_3$, $CsGaF_3$, $CsGaCl_3$, $CsGaBr_3$, $CsGaI_3$, $CsGeF_3$, $CsGeCl_3$, $CsGeBr_3$, $CsGeI_3$, $CsAsF_3$, $CsAsCl_3$, $CsAsBr_3$, $CsAsI_3$, $CsScF_3$, $CsSeCl_3$, $CsSeBr_3$, $CsSeI_3$, $CsPbF_3$, $CsPbCl_3$, $CsPbBr_3$, $CsPbI_3$, $ScBeF_3$, $ScBeCl_3$, $ScBeBr_3$, $ScBeI_3$, $ScMgF_3$, $ScMgCl_3$, $ScMgBr_3$, $ScMgI_3$, $ScCaF_3$, $ScCaCl_3$, $ScCaBr_3$, $ScCaI_3$, $ScSrF_3$, $ScSrCl_3$, $ScSrBr_3$, $ScSrI_3$, $ScBaF_3$, $ScBaCl_3$, $ScBaBr_3$, $ScBaI_3$, $ScRaF_3$, $ScRaCl_3$, $ScRaBr_3$, $ScRaI_3$, $Sc_2F_3$, $Sc_2Cl_3$, $Sc_2Br_3$, $Sc_2I_3$, $ScTiF_3$, $ScTiCl_3$, $ScTiBr_3$, $ScTiI_3$, $ScVF_3$, $ScVCl_3$, $ScVBr_3$, $ScVI_3$, $ScCrF_3$, $ScCrCl_3$, $ScCrBr_3$, $ScCrI_3$, $ScMnF_3$, $ScMnCl_3$, $ScMnBr_3$, $ScMnI_3$, $ScFeF_3$, $ScFeCl_3$, $ScFeBr_3$, $ScFeI_3$, $ScCoF_3$, $ScCoCl_3$, $ScCoBr_3$, $ScCoI_3$, $ScNiF_3$, $ScNiCl_3$, $ScNiBr_3$, $ScNiI_3$, $ScCuF_3$, $ScCuCl_3$, $SeCuBr_3$, $ScCuI_3$, $ScZnF_3$, $ScZnCl_3$, $ScZnBr_3$, $ScZnI_3$, $ScGaF_3$, $ScGaCl_3$, $ScGaBr_3$, $ScGaI_3$, $ScGeF_3$, $ScGeCl_3$, $ScGeBr_3$, $ScGeI_3$, $ScAsF_3$, $ScAsCl_3$, $ScAsBr_3$, $ScAsI_3$, $ScScF_3$, $ScScCl_3$, $ScSeBr_3$, $ScSeI_3$, $ScPbF_3$, $ScPbCl_3$, $ScPbBr_3$, $ScPbI_3$, $TiBeF_3$, $TiBeCl_3$, $TiBeBr_3$, $TiBeI_3$, $TiMgF_3$, $TiMgCl_3$, $TiMgBr_3$, $TiMgI_3$, $TiCaF_3$, $TiCaCl_3$, $TiCaBr_3$, $TiCaI_3$, $TiSrF_3$, $TiSrCl_3$, $TiSrBr_3$, $TiSrI_3$, $TiBaF_3$, $TiBaCl_3$, $TiBaBr_3$, $TiBaI_3$, $TiRaF_3$, $TiRaCl_3$, $TiRaBr_3$, $TiRaI_3$, $TiScF_3$, $TiScCl_3$, $TiScBr_3$, $TiScI_3$, $Ti_2F_3$, $Ti_2Cl_3$, $Ti_2Br_3$, $Ti_2I_3$, $TiVF_3$, $TiVCl_3$, $TiVBr_3$, $TiVI_3$, $TiCrF_3$, $TiCrCl_3$, $TiCrBr_3$, $TiCrI_3$, $TiMnF_3$, $TiMnCl_3$, $TiMnBr_3$, $TiMnI_3$, $TiFeF_3$, $TiFeCl_3$, $TiFeBr_3$, $TiFeI_3$, $TiCoF_3$, $TiCoCl_3$, $TiCoBr_3$, $TiCoI_3$, $TiNiF_3$, $TiNiCl_3$, $TiNiBr_3$, $TiNiI_3$, $TiCuF_3$, $TiCuCl_3$, $TiCuBr_3$, $TiCuI_3$, $TiZnF_3$, $TiZnCl_3$, $TiZnBr_3$, $TiZnI_3$, $TiGaF_3$, $TiGaCl_3$, $TiGaBr_3$, $TiGaI_3$, $TiGeF_3$, $TiGeCl_3$, $TiGeBr_3$, $TiGeI_3$, $TiAsF_3$, $TiAsCl_3$, $TiAsBr_3$, $TiAsI_3$, $TiScF_3$, $TiScCl_3$, $TiSeBr_3$, $TiScI_3$, $TiPbF_3$, $TiPbCl_3$, $TiPbBr_3$, $TiPbI_3$, $VBeF_3$, $VBeCl_3$, $VBeBr_3$, $VBcI_3$, $VMgF_3$, $VMgCl_3$, $VMgBr_3$, $VMgI_3$, $VCaF_3$, $VCaCl_3$, $VCaBr_3$, $VCaI_3$, $VSrF_3$, $VSrCl_3$, $VSrBr_3$, $VSrI_3$, $VBaF_3$, $VBaCl_3$, $VBaBr_3$, $VBaI_3$, $VRaF_3$, $VRaCl_3$, $VRaBr_3$, $VRaI_3$, $VScF_3$, $VScCl_3$, $VScBr_3$, $VScI_3$, $VTiF_3$, $VTiCl_3$, $VTiBr_3$, $VTiI_3$, $V_2F_3$, $V_2Cl_3$, $V_2Br_3$, $V_2I_3$, $VCrF_3$, $VCrCl_3$, $VCrBr_3$, $VCrI_3$, $VMnF_3$, $VMnCl_3$, $VMnBr_3$, $VMnI_3$, $VFeF_3$, $VFeCl_3$, $VFeBr_3$, $VFeI_3$, $VCoF_3$, $VCoCl_3$, $VCoBr_3$, $VCoI_3$, $VNiF_3$, $VNiCl_3$, $VNiBr_3$, $VNiI_3$, $VCuF_3$, $VCuCl_3$, $VCuBr_3$, $VCuI_3$, $VZnF_3$, $VZnCl_3$, $VZnBr_3$, $VZnI_3$, $VGaF_3$, $VGaCl_3$, $VGaBr_3$, $VGaI_3$, $VGeF_3$, $VGeCl_3$, $VGeBr_3$, $VGeI_3$, $VAsF_3$, $VAsCl_3$, $VAsBr_3$, $VAsI_3$, $VSeF_3$, $VSeCl_3$, $VSeBr_3$, $VSeI_3$, $VPbF_3$, $VPbCl_3$, $VPbBr_3$, $VPbI_3$, $CrBeF_3$, $CrBeCl_3$, $CrBeBr_3$, $CrBcI_3$, $CrMgF_3$, $CrMgCl_3$, $CrMgBr_3$, $CrMgI_3$, $CrCaF_3$, $CrCaCl_3$, $CrCaBr_3$, $CrCaI_3$, $CrSrF_3$, $CrSrCl_3$, $CrSrBr_3$, $CrSrI_3$, $CrBaF_3$, $CrBaCl_3$, $CrBaBr_3$, $CrBaI_3$, $CrRaF_3$, $CrRaCl_3$, $CrRaBr_3$, $CrRaI_3$, $CrScF_3$, $CrScCl_3$, $CrScBr_3$, $CrScI_3$, $CrTiF_3$, $CrTiCl_3$, $CrTiBr_3$, $CrTiI_3$, $CrVF_3$, $CrVCl_3$, $CrVBr_3$, $CrVI_3$, $Cr_2F_3$, $Cr_2Cl_3$, $Cr_2Br_3$, $Cr_2I_3$, $CrMnF_3$, $CrMnCl_3$, $CrMnBr_3$, $CrMnI_3$, $CrFeF_3$, $CrFeCl_3$, $CrFeBr_3$, $CrFeI_3$, $CrCoF_3$, $CrCoCl_3$, $CrCoBr_3$, $CrCoI_3$, $CrNiF_3$, $CrNiCl_3$, $CrNiBr_3$, $CrNiI_3$, $CrCuF_3$, $CrCuCl_3$, $CrCuBr_3$, $CrCuI_3$, $CrZnF_3$, $CrZnCl_3$, $CrZnBr_3$, $CrZnI_3$, $CrGaF_3$, $CrGaCl_3$, $CrGaBr_3$, $CrGaI_3$, $CrGeF_3$, $CrGeCl_3$, $CrGeBr_3$, $CrGeI_3$, $CrAsF_3$, $CrAsCl_3$, $CrAsBr_3$, $CrAsI_3$, $CrScF_3$, $CrSeCl_3$, $CrSeBr_3$, $CrSeI_3$, $CrPbF_3$, $CrPbCl_3$, $CrPbBr_3$, $CrPbI_3$, $MnBeF_3$, $MnBeCl_3$, $MnBeBr_3$, $MnBeI_3$, $MnMgF_3$, $MnMgCl_3$, $MnMgBr_3$, $MnMgI_3$, $MnCaF_3$, $MnCaCl_3$, $MnCaBr_3$, $MnCaI_3$, $MnSrF_3$, $MnSrCl_3$, $MnSrBr_3$, $MnSrI_3$, $MnBaF_3$, $MnBaCl_3$, $MnBaBr_3$, $MnBaI_3$, $MnRaF_3$, $MnRaCl_3$, $MnRaBr_3$, $MnRaI_3$, $MnScF_3$, $MnScCl_3$, $MnScBr_3$, $MnScI_3$, $MnTiF_3$, $MnTiCl_3$, $MnTiBr_3$, $MnTiI_3$, $MnVF_3$, $MnVCl_3$, $MnVBr_3$, $MnVI_3$, $MnCrF_3$, $MnCrCl_3$, $MnCrBr_3$, $MnCrI_3$, $Mn_2F_3$, $Mn_2Cl_3$, $Mn_2Br_3$, $Mn_2I_3$, $MnFeF_3$, $MnFeCl_3$, $MnFeBr_3$, $MnFeI_3$, $MnCoF_3$, $MnCoCl_3$, $MnCoBr_3$, $MnCoI_3$, $MnNiF_3$, $MnNiCl_3$, $MnNiBr_3$, $MnNiI_3$, $MnCuF_3$, $MnCuCl_3$, $MnCuBr_3$, $MnCuI_3$, $MnZnF_3$, $MnZnCl_3$, $MnZnBr_3$, $MnZnI_3$, $MnGaF_3$, $MnGaCl_3$, $MnGaBr_3$, $MnGaI_3$, $MnGcF_3$, $MnGcCl_3$, $MnGeBr_3$, $MnGeI_3$, $MnAsF_3$, $MnAsCl_3$, $MnAsBr_3$, $MnAsI_3$, $MnScF_3$, $MnScCl_3$, $MnScBr_3$, $MnScI_3$, $MnPbF_3$, $MnPbCl_3$, $MnPbBr_3$, $MnPbI_3$, $FcBeF_3$, $FeBeCl_3$, $FeBeBr_3$, $FeBcI_3$, $FcMgF_3$, $FeMgCl_3$, $FeMgBr_3$, $FcMgI_3$, $FeCaF_3$, $FeCaCl_3$, $FeCaBr_3$, $FeCaI_3$, $FeSrF_3$, $FeSrCl_3$, $FeSrBr_3$, $FeSrI_3$, $FeBaF_3$, $FeBaCl_3$, $FeBaBr_3$, $FeBaI_3$, $FeRaF_3$, $FeRaCl_3$, $FeRaBr_3$, $FeRaI_3$, $FeScF_3$, $FeScCl_3$, $FeScBr_3$, $FeScI_3$, $FeTiF_3$, $FeTiCl_3$, $FeTiBr_3$, $FeTiI_3$, $FeVF_3$, $FeVCl_3$, $FeVBr_3$, $FeVI_3$, $FeCrF_3$, $FeCrCl_3$, $FeCrBr_3$, $FeCrI_3$, $FeMnF_3$, $FeMnCl_3$, $FeMnBr_3$, $FeMnI_3$, $Fe_2F_3$, $Fe_2Cl_3$, $Fe_2Br_3$, $Fe_2I_3$, $FeCoF_3$, $FeCoCl_3$, $FeCoBr_3$, $FeCoI_3$, $FeNiF_3$, $FeNiCl_3$, $FeNiBr_3$, $FeNiI_3$, $FeCuF_3$, $FeCuCl_3$, $FeCuBr_3$, $FeCuI_3$, $FeZnF_3$, $FeZnCl_3$, $FeZnBr_3$, $FeZnI_3$, $FeGaF_3$, $FeGaCl_3$, $FeGaBr_3$, $FeGaI_3$, $FeGeF_3$, $FeGeCl_3$, $FeGeBr_3$, $FeGeI_3$, $FeAsF_3$, $FeAsCl_3$, $FeAsBr_3$, $FeAsI_3$, $FeScF_3$, $FeSeCl_3$, $FeSeBr_3$, $FeScI_3$, $FePbF_3$, $FePbCl_3$, $FePbBr_3$, $FePbI_3$, $CoBeF_3$, $CoBeCl_3$, $CoBcBr_3$, $CoBcI_3$, $CoMgF_3$, $CoMgCl_3$, $CoMgBr_3$, $CoMgI_3$, $CoCaF_3$, $CoCaCl_3$, $CoCaBr_3$, $CoCaI_3$, $CoSrF_3$, $CoSrCl_3$, $CoSrBr_3$, $CoSrI_3$, $CoBaF_3$, $CoBaCl_3$, $CoBaBr_3$, $CoBaI_3$, $CoRaF_3$, $CoRaCl_3$, $CoRaBr_3$, $CoRaI_3$, $CoScF_3$, $CoScCl_3$, $CoScBr_3$, $CoScI_3$, $CoTiF_3$, $CoTiCl_3$, $CoTiBr_3$, $CoTiI_3$, $CoVF_3$, $CoVCl_3$, $CoVBr_3$, $CoVI_3$, $CoCrF_3$, $CoCrCl_3$, $CoCrBr_3$, $CoCrI_3$, $CoMnF_3$, $CoMnCl_3$, $CoMnBr_3$, $CoMnI_3$, $CoFeF_3$, $CoFeCl_3$, $CoFeBr_3$, $CoFeI_3$, $Co_2F_3$, $Co_2Cl_3$, $CO_2Br_3$, $Co_2I_3$, $CoNiF_3$, $CONiCl_3$, $CoNiBr_3$, $CONiI_3$, $CoCuF_3$, $CoCuCl_3$, $CoCuBr_3$, $CoCuI_3$, $CoZnF_3$, $CoZnCl_3$, $CoZnBr_3$, $CoZnI_3$, $CoGaF_3$, $CoGaCl_3$, $CoGaBr_3$, $CoGaI_3$, $CoGeF_3$, $CoGeCl_3$, $CoGeBr_3$, $CoGeI_3$, $CoAsF_3$, $CoAsCl_3$, $CoAsBr_3$, $CoAsI_3$, $CoSeF_3$, $CoSeCl_3$, $CoSeBr_3$, $CoSeI_3$, $CoPbF_3$, $CoPbCl_3$, $CoPbBr_3$, $CoPbI_3$, $NiBeF_3$, $NiBeCl_3$, $NiBeBr_3$, $NiBeI_3$, $NiMgF_3$, $NiMgCl_3$, $NiMgBr_3$, $NiMgI_3$, $NiCaF_3$, $NiCaCl_3$, $NiCaBr_3$, $NiCaI_3$, $NiSrF_3$, $NiSrCl_3$, $NiSrBr_3$, $NiSrI_3$, $NiBaF_3$, $NiBaCl_3$, $NiBaBr_3$, $NiBaI_3$, $NiRaF_3$, $NiRaCl_3$, $NiRaBr_3$, $NiRaI_3$, $NiScF_3$, $NiScCl_3$, $NiScBr_3$, $NiScI_3$, $NiTiF_3$, $NiTiCl_3$, $NiTiBr_3$, $NiTiI_3$, $NiVF_3$, $NiVCl_3$, $NiVBr_3$, $NiVI_3$, $NiCrF_3$, $NiCrCl_3$, $NiCrBr_3$, $NiCrI_3$, $NiMnF_3$, $NiMnCl_3$, $NiMnBr_3$, $NiMnI_3$, $NiFeF_3$, $NiFeCl_3$, $NiFeBr_3$, $NiFeI_3$, $NiCoF_3$, $NiCoCl_3$, $NiCoBr_3$, $NiCoI_3$, $Ni_2F_3$, $Ni_2Cl_3$, $Ni_2Br_3$, $Ni_2I_3$, $NiCuF_3$, $NiCuCl_3$, $NiCuBr_3$, $NiCuI_3$, $NiZnF_3$, $NiZnCl_3$, $NiZnBr_3$, $NiZnI_3$, $NiGaF_3$, $NiGaCl_3$, $NiGaBr_3$, $NiGaI_3$, $NiGeF_3$, $NiGeCl_3$, $NiGeBr_3$, $NiGeI_3$, $NiAsF_3$, $NiAsCl_3$, $NiAsBr_3$, $NiAsI_3$, $NiSeF_3$, $NiSeCl_3$, $NiSeBr_3$, $NiScI_3$, $NiPbF_3$, $NiPbCl_3$, $NiPbBr_3$, $NiPbI_3$, $CuBeF_3$, $CuBeCl_3$, $CuBeBr_3$, $CuBeI_3$, $CuMgF_3$, $CuMgCl_3$, $CuMgBr_3$, $CuMgI_3$, $CuCaF_3$, $CuCaCl_3$, $CuCaBr_3$, $CuCaI_3$, $CuSrF_3$, $CuSrCl_3$, $CuSrBr_3$, $CuSrI_3$, $CuBaF_3$, $CuBaCl_3$, $CuBaBr_3$, $CuBaI_3$, $CuRaF_3$, $CuRaCl_3$, $CuRaBr_3$, $CuRaI_3$, $CuScF_3$, $CuScCl_3$, $CuScBr_3$, $CuScI_3$, $CuTiF_3$, $CuTiCl_3$, $CuTiBr_3$, $CuTiI_3$, $CuVF_3$, $CuVCl_3$, $CuVBr_3$, $CuVI_3$, $CuCrF_3$, $CuCrCl_3$, $CuCrBr_3$, $CuCrI_3$, $CuMnF_3$, $CuMnCl_3$, $CuMnBr_3$, $CuMnI_3$, $CuFeF_3$, $CuFeCl_3$, $CuFeBr_3$, $CuFeI_3$, $CuCoF_3$, $CuCoCl_3$, $CuCoBr_3$, $CuCoI_3$, $CuNiF_3$, $CuNiCl_3$, $CuNiBr_3$, $CuNiI_3$, $Cu_2F_3$, $Cu_2Cl_3$, $Cu_2Br_3$, $Cu_2I_3$, $CuZnF_3$, $CuZnCl_3$, $CuZnBr_3$, $CuZnI_3$, $CuGaF_3$, $CuGaCl_3$, $CuGaBr_3$, $CuGaI_3$, $CuGeF_3$, $CuGeCl_3$, $CuGeBr_3$, $CuGeI_3$, $CuAsF_3$, $CuAsCl_3$, $CuAsBr_3$, $CuAsI_3$, $CuScF_3$, $CuScCl_3$, $CuSeBr_3$, $CuSeI_3$, $CuPbF_3$, $CuPbCl_3$, $CuPbBr_3$, $CuPbI_3$, $ZnBeF_3$, $ZnBeCl_3$, $ZnBcBr_3$, $ZnBcI_3$, $ZnMgF_3$, $ZnMgCl_3$, $ZnMgBr_3$, $ZnMgI_3$, $ZnCaF_3$, $ZnCaCl_3$, $ZnCaBr_3$, $ZnCaI_3$, $ZnSrF_3$, $ZnSrCl_3$, $ZnSrBr_3$, $ZnSrI_3$, $ZnBaF_3$, $ZnBaCl_3$, $ZnBaBr_3$, $ZnBaI_3$, $ZnRaF_3$, $ZnRaCl_3$, $ZnRaBr_3$, $ZnRaI_3$, $ZnScF_3$, $ZnScCl_3$, $ZnScBr_3$, $ZnScI_3$, $ZnTiF_3$, $ZnTiCl_3$, $ZnTiBr_3$, $ZnTiI_3$, $ZnVF_3$, $ZnVCl_3$, $ZnVBr_3$, $ZnVI_3$, $ZnCrF_3$, $ZnCrCl_3$, $ZnCrBr_3$, $ZnCrI_3$, $ZnMnF_3$, $ZnMnCl_3$, $ZnMnBr_3$, $ZnMnI_3$, $ZnFeF_3$, $ZnFeCl_3$, $ZnFeBr_3$, $ZnFeI_3$, $ZnCoF_3$, $ZnCoCl_3$, $ZnCoBr_3$, $ZnCoI_3$, $ZnNiF_3$, $ZnNiCl_3$, $ZnNiBr_3$, $ZnNiI_3$, $ZnCuF_3$, $ZnCuCl_3$, $ZnCuBr_3$, $ZnCuI_3$, $Zn_2F_3$, $Zn_2Cl_3$, $Zn_2Br_3$, $Zn_2I_3$, $ZnGaF_3$, $ZnGaCl_3$, $ZnGaBr_3$, $ZnGaI_3$, $ZnGeF_3$, $ZnGeCl_3$, $ZnGeBr_3$, $ZnGeI_3$, $ZnAsF_3$, $ZnAsCl_3$, $ZnAsBr_3$, $ZnAsI_3$, $ZnSeF_3$, $ZnSeCl_3$. $ZnSeBr_3$, $ZnSeI_3$, $ZnPbF_3$, $ZnPbCl_3$, $ZnPbBr_3$, $ZnPbI_3$, $GaBeF_3$, $GaBeCl_3$, $GaBcBr_3$, $GaBeI_3$, $GaMgF_3$, $GaMgCl_3$, $GaMgBr_3$, $GaMgI_3$, $GaCaF_3$, $GaCaCl_3$, $GaCaBr_3$, $GaCaI_3$, $GaSrF_3$, $GaSrCl_3$, $GaSrBr_3$, $GaSrI_3$, $GaBaF_3$, $GaBaCl_3$, $GaBaBr_3$, $GaBaI_3$, $GaRaF_3$, $GaRaCl_3$, $GaRaBr_3$, $GaRaI_3$, $GaScF_3$, $GaScCl_3$, $GaScBr_3$, $GaScI_3$, $GaTiF_3$, $GaTiCl_3$, $GaTiBr_3$, $GaTiI_3$, $GaVF_3$, $GaVCl_3$, $GaVBr_3$, $GaVI_3$, $GaCrF_3$, $GaCrCl_3$, $GaCrBr_3$, $GaCrI_3$, $GaMnF_3$, $GaMnCl_3$, $GaMnBr_3$, $GaMnI_3$, $GaFeF_3$, $GaFeCl_3$, $GaFeBr_3$, $GaFeI_3$, $GaCoF_3$, $GaCoCl_3$, $GaCoBr_3$, $GaCoI_3$, $GaNiF_3$, $GaNiCl_3$, $GaNiBr_3$, $GaNiI_3$, $GaCuF_3$, $GaCuCl_3$, $GaCuBr_3$, $GaCuI_3$, $GaZnF_3$, $GaZnCl_3$, $GaZnBr_3$, $GaZnI_3$, $Ga_2F_3$, $Ga_2Cl_3$, $Ga_2Br_3$, $Ga_2I_3$, $GaGeF_3$, $GaGeCl_3$, $GaGeBr_3$, $GaGeI_3$, $GaAsF_3$, $GaAsCl_3$, $GaAsBr_3$, $GaAsI_3$, $GaScF_3$, $GaScCl_3$, $GaScBr_3$, $GaScI_3$, $GaPbF_3$, $GaPbCl_3$, $GaPbBr_3$, $GaPbI_3$, $GeBeF_3$, $GeBeCl_3$, $GeBeBr_3$, $GeBeI_3$, $GeMgF_3$, $GeMgCl_3$, $GeMgBr_3$, $GeMgI_3$, $GeCaF_3$, $GeCaCl_3$, $GeCaBr_3$, $GeCaI_3$, $GeSrF_3$, $GeSrCl_3$, $GeSrBr_3$, $GeSrI_3$, $GeBaF_3$, $GeBaCl_3$, $GeBaBr_3$, $GeBaI_3$, $GeRaF_3$, $GeRaCl_3$, $GeRaBr_3$, $GeRaI_3$, $GeScF_3$, $GeScCl_3$, $GeScBr_3$, $GeScI_3$, $GeTiF_3$, $GeTiCl_3$, $GeTiBr_3$, $GeTiI_3$, $GeVF_3$, $GeVCl_3$, $GeVBr_3$, $GeVI_3$, $GeCrF_3$, $GeCrCl_3$, $GeCrBr_3$, $GeCrI_3$, $GeMnF_3$, $GeMnCl_3$, $GeMnBr_3$, $GeMnI_3$, $GeFeF_3$, $GeFeCl_3$, $GeFeBr_3$, $GeFeI_3$, $GeCoF_3$, $GeCoCl_3$, $GeCoBr_3$, $GeCoI_3$, $GeNiF_3$, $GeNiCl_3$, $GeNiBr_3$, $GeNiI_3$, $GeCuF_3$, $GeCuCl_3$, $GeCuBr_3$, $GeCuI_3$, $GeZnF_3$, $GeZnCl_3$, $GeZnBr_3$, $GeZnI_3$, $GeGaF_3$, $GeGaCl_3$, $GeGaBr_3$, $GeGaI_3$, $GezF_3$, $Ge_2Cl_3$, $Ge_2Br_3$, $Ge_2I_3$, $GeAsF_3$, $GeAsCl_3$, $GeAsBr_3$, $GeAsI_3$, $GeScF_3$, $GeSeCl_3$, $GeSeBr_3$, $GeSeI_3$, $GePbF_3$, $GePbCl_3$, $GePbBr_3$, $GePbI_3$, $AsBeF_3$, $AsBeCl_3$, $AsBeBr_3$, $AsBeI_3$, $AsMgF_3$, $AsMgCl_3$, $AsMgBr_3$, $AsMgI_3$, $AsCaF_3$, $AsCaCl_3$, $AsCaBr_3$, $AsCaI_3$, $AsSrF_3$, $AsSrCl_3$, $AsSrBr_3$, $AsSrI_3$, $AsBaF_3$, $AsBaCl_3$, $AsBaBr_3$, $AsBaI_3$, $AsRaF_3$, $AsRaCl_3$, $AsRaBr_3$, $AsRaI_3$, $AsScF_3$, $AsScCl_3$, $AsScBr_3$, $AsScI_3$, $AsTiF_3$, $AsTiCl_3$, $AsTiBr_3$, $AsTiI_3$, $AsVF_3$, $AsVCl_3$, $AsVBr_3$, $AsVI_3$, $AsCrF_3$, $AsCrCl_3$, $AsCrBr_3$, $AsCrI_3$, $AsMnF_3$, $AsMnCl_3$, $AsMnBr_3$, $AsMnI_3$, $AsFeF_3$, $AsFeCl_3$, $AsFeBr_3$, $AsFeI_3$, $AsCoF_3$, $AsCoCl_3$, $AsCoBr_3$, $AsCoI_3$, $AsNiF_3$, $AsNiCl_3$, $AsNiBr_3$, $AsNiI_3$, $AsCuF_3$, $AsCuCl_3$, $AsCuBr_3$, $AsCuI_3$, $AsZnF_3$, $AsZnCl_3$, $AsZnBr_3$, $AsZnI_3$, $AsGaF_3$, $AsGaCl_3$, $AsGaBr_3$, $AsGaI_3$, $AsGeF_3$, $AsGeCl_3$, $AsGeBr_3$, $AsGeI_3$, $As_2F_3$, $As_2Cl_3$, $AszBr_3$, $As_2I_3$, $AsSeF_3$, $AsSeCl_3$, $AsSeBr_3$, $AsSeI_3$, $AsPbF_3$, $AsPbCl_3$, $AsPbBr_3$, $AsPbI_3$, $SeBeF_3$, $ScBeCl_3$, $SeBeBr_3$, $ScBeI_3$, $ScMgF_3$, $ScMgCl_3$, $ScMgBr_3$, $ScMgI_3$, $ScCaF_3$, $ScCaCl_3$, $ScCaBr_3$, $SeCaI_3$, $SeSrF_3$, $SeSrCl_3$, $SeSrBr_3$, $SeSrI_3$, $ScBaF_3$, $ScBaCl_3$, $ScBaBr_3$, $ScBaI_3$, $ScRaF_3$, $SeRaCl_3$, $SeRaBr_3$, $ScRaI_3$, $SeScF_3$, $SeScCl_3$, $SeScBr_3$, $SeScI_3$, $ScTiF_3$, $SeTiCl_3$, $SeTiBr_3$, $SeTiI_3$, $SeVF_3$, $SeVCl_3$, $SeVBr_3$, $SeVI_3$, $SeCrF_3$, $SeCrCl_3$, $SeCrBr_3$, $ScCrI_3$, $SeMnF_3$, $SeMnCl_3$, $SeMnBr_3$, $SeMnI_3$, $SeFeF_3$, $SeFeCl_3$, $SeFeBr_3$, $SeFeI_3$, $SeCoF_3$, $SeCoCl_3$, $SeCoBr_3$, $SeCoI_3$, $SeNiF_3$, $SeNiCl_3$, $SeNiBr_3$, $SeNiI_3$, $SeCuF_3$, $SeCuCl_3$, $SeCuBr_3$, $SeCuI_3$, $SeZnF_3$, $SeZnCl_3$, $SeZnBr_3$, $SeZnI_3$, $SeGaF_3$, $SeGaCl_3$, $SeGaBr_3$, $SeGaI_3$, $SeGeF_3$, $SeGeCl_3$, $SeGeBr_3$, $SeGeI_3$, $SeAsF_3$, $SeAsCl_3$, $SeAsBr_3$, $SeAsI_3$, $Se_2F_3$, $Se_2Cl_3$, $Se_2Br_3$, $Sc_2I_3$, $ScPbF_3$, $SePbCl_3$, $SePbBr_3$, $SePbI_3$, $BiBeF_3$, $BiBeCl_3$, $BiBeBr_3$, $BiBeI_3$, $BiMgF_3$, $BiMgCl_3$, $BiMgBr_3$, $BiMgI_3$, $BiCaF_3$, $BiCaCl_3$, $BiCaBr_3$, $BiCaI_3$, $BiSrF_3$, $BiSrCl_3$, $BiSrBr_3$, $BiSrI_3$, $BiBaF_3$, $BiBaCl_3$, $BiBaBr_3$, $BiBaI_3$, $BiRaF_3$, $BiRaCl_3$, $BiRaBr_3$, $BiRaI_3$, $BiScF_3$, $BiScCl_3$, $BiScBr_3$, $BiScI_3$, $BiTiF_3$, $BiTiCl_3$, $BiTiBr_3$, $BiTiI_3$, $BiVF_3$, $BiVCl_3$, $BiVBr_3$, $BiVI_3$, $BiCrF_3$, $BiCrCl_3$, $BiCrBr_3$, $BiCrI_3$, $BiMnF_3$, $BiMnCl_3$, $BiMnBr_3$, $BiMnI_3$, $BiFeF_3$, $BiFeCl_3$, $BiFeBr_3$, $BiFcl_3$, $BiCoF_3$, $BiCoCl_3$, $BiCoBr_3$, $BiCoI_3$, $BiNiF_3$, $BiNiCl_3$, $BiNiBr_3$, $BiNiI_3$, $BiCuF_3$, $BiCuCl_3$, $BiCuBr_3$, $BiCuI_3$, $BiZnF_3$, $BiZnCl_3$, $BiZnBr_3$, $BiZnI_3$, $BiGaF_3$, $BiGaCl_3$, $BiGaBr_3$, $BiGaI_3$, $BiGcF_3$, $BiGeCl_3$, $BiGeBr_3$, $BiGeI_3$, $BiAsF_3$, $BiAsCl_3$, $BiAsBr_3$, $BiAsI_3$, $BiScF_3$, $BiSeCl_3$, $BiScBr_3$, $BiScI_3$, $BiPbF_3$, $BiPbCl_3$, $BiPbBr_3$, $BiPbI_3$, $LiSnF_3$, $LiSnCl_3$, $LiSnBr_3$, $LiSnI_3$, $NaSnF_3$, $NaSnCl_3$, $NaSnBr_3$, $NaSnI_3$, $KSnF_3$, $KSnCl_3$, $KSnBr_3$, $KSnI_3$, $RbSnF_3$, $RbSnCl_3$, $RbSnBr_3$, $RbSnI_3$, $CsSnF_3$, $CsSnCl_3$, $CsSnBr_3$, $CsSnI_3$, $ScSnF_3$, $ScSnCl_3$, $ScSnBr_3$, $ScSnI_3$, $TiSnF_3$, $TiSnCl_3$, $TiSnBr_3$, $TiSnI_3$, $VSnF_3$, $VSnCl_3$, $VSnBr_3$, $VSnI_3$, $CrSnF_3$, $CrSnCl_3$, $CrSnBr_3$, $CrSnI_3$, $MnSnF_3$, $MnSnCl_3$, $MnSnBr_3$, $MnSnI_3$, $FcSnF_3$, $FeSnCl_3$, $FeSnBr_3$, $FeSnI_3$, $CoSnF_3$, $CoSnCl_3$, $CoSnBr_3$. $CoSnI_3$, $NiSnF_3$, $NiSnCl_3$, $NiSnBr_3$, $NiSnI_3$, $CuSnF_3$, $CuSnCl_3$, $CuSnBr_3$, $CuSnI_3$, $ZnSnF_3$, $ZnSnCl_3$, $ZnSnBr_3$, $ZnSnI_3$, $GaSnF_3$, $GaSnCl_3$, $GaSnBr_3$, $GaSnI_3$, $GeSnF_3$, $GeSnCl_3$, $GeSnBr_3$, $GeSnI_3$, $AsSnF_3$, $AsSnCl_3$, $AsSnBr_3$, $AsSnI_3$, $SeSnF_3$, $SeSnCl_3$, $SeSnBr_3$, $SeSnI_3$, $BiSnF_3$, $BiSnCl_3$, $BiSnBr_3$, $BiSnI_3$ In specific embodiments of the present invention, lanthanides and transition metals can be used as the dopant instead of ytterbium.

Lanthanides which may be used as a dopant for specific embodiments of the present invention include but are not limited to: Lanthanum, Europium, Samarium, Promethium, Gadolinium, Terbium, Praseodymium, Cerium, Neodymium, Thulium, Erbium, Dysprosium, Lutetium, and Holmium.

Transition metals which may be used as a dopant for specific embodiments of the present invention include but are not limited to all stable ions of: Copper, Iron, Cobalt, Manganese, Vanadium, Chromium, Titanium, Zinc, Molybdenum, Niobium, Zirconium, Tungsten, Technetium, Hafnium, Scandium, Nickel, Tantalum, Yttrium, Silver, Ruthenium, Rhodium, Palladium, Osmium, Platinum, Iridium, Seaborgium, Rhenium, Dubnium, Cadmium, Rutherfordium, Gold, Roentgenium, Mercury, Copernicium, Darmstadtium, Hassium, Meitnerium, Bohrium.

Specific embodiments of the present invention may also use any stable ion of bismuth as a dopant.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The foregoing description, for the purpose of explanation, has been described with reference to specific example embodiments. However, the illustrative discussions above are not intended to be exhaustive or to limit the possible example embodiments to the precise forms disclosed. Many modifications and variations are possible in view of the above teachings. The example embodiments were chosen and described in order to best explain the principles involved and their practical applications, to thereby enable others skilled in the art to best utilize the various example embodiments with various modifications as are suited to the particular use contemplated.

It will also be understood that, although the terms “first,” “second,” and so forth may be used herein to describe various elements, these elements should not be limited by these terms. These terms are only used to distinguish one element from another. For example, a first contact could be termed a second contact, and, similarly, a second contact could be termed a first contact, without departing from the scope of the present example embodiments. The first contact and the second contact are both contacts, but they are not the same contact.

The terminology used in the description of the example embodiments herein is for the purpose of describing particular example embodiments only and is not intended to be limiting. As used in the description of the example embodiments and the appended examples, the singular forms “a.” “an.” and “the” are intended to include the plural forms as well, unless the context clearly indicates otherwise. It will also be understood that the term “and/or” as used herein refers to and encompasses any and all possible combinations of one or more of the associated listed items. It will be further understood that the terms “comprises” and/or “comprising.” when used in this specification, specify the presence of stated features, integers, steps, operations, elements, and/or components, but do not preclude the presence or addition of one or more other features, integers, steps, operations, elements, components, and/or groups thereof.

As used herein, the term “if” may be construed to mean “when” or “upon” or “in response to determining” or “in response to detecting.” depending on the context. Similarly, the phrase “if it is determined” or “if [a stated condition or event] is detected” may be construed to mean “upon determining” or “in response to determining” or “upon detecting [the stated condition or event]” or “in response to detecting [the stated condition or event],” depending on the context.

Although example embodiments of the present disclosure are explained in some instances in detail herein, it is to be understood that other embodiments are contemplated. Accordingly, it is not intended that the present disclosure be limited in its scope to the details of construction and arrangement of components set forth in the following description or illustrated in the drawings. The present disclosure is capable of other embodiments and of being practiced or carried out in various ways.

It should be appreciated that any of the components or modules referred to with regards to any of the present invention embodiments discussed herein, may be integrally or separately formed with one another. Further, redundant functions or structures of the components or modules may be implemented. Moreover, the various components may be communicated locally and/or remotely with any user/operator/customer/client or machine/system/computer/processor. Moreover, the various components may be in communication via wireless and/or hardwire or other desirable and available communication means, systems, and hardware. Moreover, various components and modules may be substituted with other modules or components that provide similar functions.

It should be appreciated that the device and related components discussed herein may take on all shapes along the entire continual geometric spectrum of manipulation of x, y and z planes to provide and meet the environmental, anatomical, and structural demands and operational requirements. Moreover, locations and alignments of the various components may vary as desired or required.

It should be appreciated that various sizes, dimensions, contours, rigidity, shapes, flexibility and materials of any of the components or portions of components in the various embodiments discussed throughout may be varied and utilized as desired or required.

It should be appreciated that while some dimensions are provided on the aforementioned figures, the device may constitute various sizes, dimensions, contours, rigidity, shapes, flexibility and materials as it pertains to the components or portions of components of the device, and therefore may be varied and utilized as desired or required.

It must also be noted that, as used in the specification and the appended claims, the singular forms “a,” “an” and “the” include plural referents unless the context clearly dictates otherwise. Ranges may be expressed herein as from “about” or “approximately” one particular value and/or to “about” or “approximately” another particular value. When such a range is expressed, other exemplary embodiments include from the one particular value and/or to the other particular value.

By “comprising” or “containing” or “including” is meant that at least the named compound, element, particle, or method step is present in the composition or article or method, but does not exclude the presence of other compounds, materials, particles, or method steps, even if the other such compounds, material, particles, or method steps have the same function as what is named.

In describing example embodiments, terminology will be resorted to for the sake of clarity. It is intended that each term contemplates its broadest meaning as understood by those skilled in the art and includes all technical equivalents that operate in a similar manner to accomplish a similar purpose. It is also to be understood that the mention of one or more steps of a method does not preclude the presence of additional method steps or intervening method steps between those steps expressly identified. Steps of a method may be performed in a different order than those described herein without departing from the scope of the present disclosure. Similarly, it is also to be understood that the mention of one or more components in a device or system does not preclude the presence of additional components or intervening components between those components expressly identified.

Some references, which may include various patents, patent applications, and publications, are cited in a reference list and discussed in the disclosure provided herein. The citation and/or discussion of such references is provided merely to clarify the description of the present disclosure and is not an admission that any such reference is "prior art" to any aspects of the present disclosure described herein. In terms of notation, "[n]" corresponds to the $n^{th}$ reference in the list. All references cited and discussed in this specification are incorporated herein by reference in their entireties and to the same extent as if each reference was individually incorporated by reference.

The term "about," as used herein, means approximately, in the region of, roughly, or around. When the term "about" is used in conjunction with a numerical range, it modifies that range by extending the boundaries above and below the numerical values set forth. In general, the term "about" is used herein to modify a numerical value above and below the stated value by a variance of 10%. In one aspect, the term "about" means plus or minus 10% of the numerical value of the number with which it is being used. Therefore, about 50% means in the range of 45%-55%. Numerical ranges recited herein by endpoints include all numbers and fractions subsumed within that range (e.g., 1 to 5 includes 1, 1.5, 2, 2.75, 3, 3.90, 4, 4.24, and 5). Similarly, numerical ranges recited herein by endpoints include subranges subsumed within that range (e.g., 1 to 5 includes 1-1.5, 1.5-2, 2-2.75, 2.75-3, 3-3.90, 3.90-4, 4-4.24, 4.24-5, 2-5, 3-5, 1-4, and 2-4). It is also to be understood that all numbers and fractions thereof are presumed to be modified by the term "about."

EXAMPLES

Practice of an aspect of an embodiment (or embodiments) of the invention will be still more fully understood from the following examples and experimental results, which are presented herein for illustration only and should not be construed as limiting the invention in any way.

Example 1. A method of forming a lanthanide or transition metal doped metal halide perovskite material, comprising: combining a monovalent metal cation-halide compound, a divalent metal cation-halide compound, and a lanthanide or transition metal halide compound in a solvent; evaporating the solvent to form a powder; and annealing the powder to form the lanthanide or transition metal doped metal halide perovskite material.

Example 2. The method of example 1, wherein the monovalent metal cation-halide compound is cesium chloride.

Example 3. The method of example 1 (as well as subject matter in whole or in part of example 2), wherein the divalent metal cation-halide compound is lead chloride.

Example 4. The method of example 1 (as well as subject matter of one or more of any combination of examples 2-3, in whole or in part), wherein the lanthanide or transition metal halide compound is lanthanide or transition metal chloride.

Example 5. The method of example 1 (as well as subject matter of one or more of any combination of examples 2-4, in whole or in part), wherein:

the monovalent metal cation-halide compound is cesium chloride;

the divalent metal cation-halide compound is lead chloride;

the lanthanide or transition metal halide compound is lanthanide or transition metal chloride; and wherein said lanthanide or transition metal doped metal halide perovskite material is lanthanide or transition metal doped cesium lead chloride.

Example 6. The method of example 5 (as well as subject matter of one or more of any combination of examples 2-4, in whole or in part), wherein said annealing of the powder to form lanthanide or transition metal doped cesium lead chloride includes:

annealing to form said lanthanide or transition metal doped cesium lead chloride with a dopant ion concentration below about 5 percent.

Example 7. The method as in any one of examples 1 or 5 (as well as subject matter of one or more of any combination of examples 2-6, in whole or in part), wherein the solvent is water.

Example 8. The method as in any one of examples 1 or 5 (as well as subject matter of one or more of any combination of examples 2-7, in whole or in part), wherein annealing the powder includes annealing at or below about 200 degrees C.

Example 9. The method as in any one of examples 1 or 5 (as well as subject matter of one or more of any combination of examples 2-8, in whole or in part), further comprising using the lanthanide or transition metal doped metal halide perovskite material is to receive emission.

Example 10. The method as in any one of examples 1 or 5 (as well as subject matter of one or more of any combination of examples 2-9, in whole or in part), further comprising using the lanthanide or transition metal doped metal halide perovskite material as a material for a scintillator device, scintillator region, scintillator component, scintillator layer, or scintillator module.

Example 11. The method of example 10, further comprising using said scintillator device, scintillator region, scintillator component, scintillator layer, or scintillator module for one of the following:

a) one or more photovoltaic (PV) devices, and optionally, said one or more photovoltaic (PV) devices are solar cells;
b) one or more photodetectors;
c) one or more light emitting diodes (LEDs);
d) one or laser Diodes (LDs);
e) one or luminescent solar concentrators;
f) one or more nuclear batteries; or
g) a photomultiplier tube (PMT).

Example 12. A photonic device, comprising:

either:

a) a semiconductor directly or indirectly coupled to a first electrode and a second electrode, or
b) a photomultiplier tube (PMT); and a lanthanide or transition metal doped metal halide perovskite material located adjacent to either:

a) said semiconductor, said first electrode, and said second electrode in electromagnetic energy communication with said lanthanide or transition metal doped metal halide perovskite material, or
b) said photomultiplier tube (PMT) in electromagnetic energy communication with said lanthanide or transition metal doped metal halide perovskite material; and wherein the lanthanide or transition metal doped metal halide perovskite material is formed by a method including:

combining a monovalent metal-halide compound, a divalent metal-halide compound, and a lanthanide or transition metal halide compound in a solvent;

evaporating the solvent to form a powder; and annealing the powder to form a lanthanide or transition metal doped metal halide perovskite.

Example 13. The photonic device of example 12, wherein the monovalent metal cation-halide compound is cesium chloride.

Example 14. The photonic device of example 12 (as well as subject matter in whole or in part of example 13), wherein the divalent metal cation-halide compound is lead chloride.

Example 15. The photonic device of example 12 (as well as subject matter of one or more of any combination of examples 13-14, in whole or in part), wherein the lanthanide or transition metal halide compound is lanthanide or transition metal chloride.

Example 16. The photonic device of example 12 (as well as subject matter of one or more of any combination of examples 13-15, in whole or in part), wherein:

the monovalent metal cation-halide compound is cesium chloride;

the divalent metal cation-halide compound is lead chloride;

the lanthanide or transition metal halide compound is lanthanide or transition metal chloride; and wherein said lanthanide or transition metal doped metal halide perovskite material is lanthanide or transition metal doped cesium lead chloride.

Example 17. The photonic device of example 16, wherein said annealing of the powder to form said lanthanide or transition metal doped cesium lead chloride includes: annealing to form said lanthanide or transition metal doped cesium lead chloride with a dopant ion concentration below about 5 percent.

Example 18. The photonic device as in any one of examples 12 or 16 (as well as subject matter of one or more of any combination of examples 13-17, in whole or in part), wherein the solvent is water.

Example 19. The photonic device as in any one of examples 12 or 16 (as well as subject matter of one or more of any combination of examples 13-18, in whole or in part), wherein said annealing of the powder includes annealing at or below about 200 degrees C.

Example 20. The photonic device as in any one of examples 12 or 16 (as well as subject matter of one or more of any combination of examples 13-19, in whole or in part), wherein the lanthanide or transition metal doped metal halide perovskite material is configured to receive emission.

Example 21. The photonic device as in any one of examples 12 or 16 (as well as subject matter of one or more of any combination of examples 13-20, in whole or in part), wherein the lanthanide or transition metal doped metal halide perovskite material is used for a scintillator device, scintillator region, scintillator component, scintillator layer, or scintillator module.

Example 22. The photonic device of example 21, wherein the scintillator device, scintillator region, scintillator component, scintillator layer, or scintillator module is configured to receive emission.

Example 23. The photonic device of example 21 (as well as subject matter in whole or in part of example 22), wherein said semiconductor, said first electrode, said second electrode, and said scintillator device, scintillator region, scintillator component, scintillator layer, or scintillator module are configured wherein the photonic device is one of the following:

a) one or more photovoltaic (PV) devices, and optionally, said one or more photovoltaic (PV) devices are solar cells;

b) one or more photodetectors;

c) one or more light emitting diodes (LEDs);

d) one or more laser Diodes (LDs);

e) one or luminescent solar concentrators; or f) one or more nuclear batteries.

Example 24. The photonic device of example 23, wherein said photodetector comprises:

micro photomultiplier, photodiode, or silicon photomultiplier.

Example 25. A power source device, comprising:

an emission source;

a photonic device in emission communication with said emission source, wherein the photonic device comprises either:

a) a semiconductor directly or indirectly coupled between a first electrode and a second electrode, or b) a photomultiplier tube (PMT); and a lanthanide or transition metal doped metal halide perovskite material located adjacent to either:

a) said semiconductor, said first electrode, and said second electrode in electromagnetic energy communication with said lanthanide or transition metal doped metal halide perovskite material, or b) said photomultiplier tube (PMT) in electro in electromagnetic energy communication with said lanthanide or transition metal doped metal halide perovskite material; and wherein the lanthanide or transition metal doped metal halide perovskite material is formed by a method including:

combining a monovalent metal-halide compound, a divalent metal-halide compound, and a lanthanide or transition metal halide compound in a solvent;

evaporating the solvent to form a powder; and annealing the powder to form lanthanide or transition metal doped metal halide perovskite material.

Example 26. The power source device of example 25, wherein the monovalent metal cation-halide compound is cesium chloride.

Example 27. The power source device of example 25 (as well as subject matter in whole or in part of example 26), wherein the divalent metal cation-halide compound is lead chloride.

Example 28. The power source device of example 25 (as well as subject matter of one or more of any combination of examples 26-27, in whole or in part), wherein the lanthanide or transition metal halide compound is lanthanide or transition metal chloride.

Example 29. The power source device of example 25 (as well as subject matter of one or more of any combination of examples 26-28, in whole or in part), wherein:

the monovalent metal cation-halide compound is cesium chloride;

the divalent metal cation-halide compound is lead chloride;

the lanthanide or transition metal halide compound is lanthanide or transition metal chloride; and wherein said lanthanide or transition metal doped metal halide perovskite material is lanthanide or transition metal doped cesium lead chloride.

Example 30. The power source device of example 29, wherein said annealing of the powder to form said lanthanide or transition metal doped cesium lead chloride includes:

annealing to form said lanthanide or transition metal doped cesium lead chloride with a dopant ion concentration below about 5 percent.

Example 31. The power source device as in any one of examples 25 or 29 (as well as subject matter of one or more of any combination of examples 26-28 and 30, in whole or in part), wherein the solvent is water.

Example 32. The power source device as in any one of examples 25 or 29 (as well as subject matter of one or more of any combination of examples 26-31, in whole or in part), wherein said annealing of the powder includes annealing at or below about 200 degrees C.

Example 33. The power source device as in any one of examples 25 or 29 (as well as subject matter of one or more of any combination of examples 26-32, in whole or in part), wherein said emission source comprises:

alpha emission, beta emission, gamma radiation, or x-ray radiation.

Example 34. The power source device as in any one of examples 25 or 29 (as well as subject matter of one or more of any combination of examples 26-33, in whole or in part), wherein the lanthanide or transition metal doped metal halide perovskite material is used for a scintillator device, scintillator region, scintillator component, scintillator layer, or scintillator module.

Example 35. The power source device of example 34, wherein said semiconductor, said first electrode, said second electrode, and said scintillator device, scintillator region, scintillator component, scintillator layer, or scintillator module are configured wherein the photonic device is one of the following:

a) one or more photovoltaic (PV) devices, and optionally, said one or more photovoltaic (PV) devices are solar cells;
b) one or more photodetectors;
c) one or more light emitting diodes (LEDs);
d) one or laser Diodes (LDs);
e) one or luminescent solar concentrators; or
f) one or more nuclear batteries.

Example 36. The power source device of example 35, wherein said photodetector comprises:

micro photomultiplier, photodiode, or silicon photomultiplier.

Example 37. The power source device of example 34 (as well as subject matter of one or more of any combination of examples 26-33 and 35-36, in whole or in part), wherein said emission source comprises:

alpha emission, beta emission, gamma radiation, or x-ray radiation.

Example 38. The method of example 1 (as well as subject matter of one or more of any combination of examples 2-11, in whole or in part), wherein said lanthanide comprises: $Ln^{2+}$, $Ce^{2+}$, $Pr^{2+}$, $Nd^{2+}$, $Pm^{2+}$, $Sm^{2+}$, $Eu^{2+}$, $Gd^{2+}$, $Tb^{2+}$, $Dy^{2+}$, $Ho^{2+}$, $Er^{2+}$, $Tm^{2+}$, $Yb^{2+}$, $Lu^{2+}$, $Ln^{3+}$, $Ce^{3+}$, $Pr^{3+}$, $Nd^{3+}$, $Pm^{3+}$, $Sm^{3+}$, $Eu^{3+}$, $Gd^{3+}$, $Tb^{3+}$, $Dy^{3+}$, $Ho^{3+}$, $Er^{3+}$, $Tm^{3+}$, $Yb^{3+}$. $Lu^{3+}$. $Ln^{4+}$, $Ce^{4+}$, $Pr^{4+}$, $Nd^{4+}$, $Pm^{4+}$, $Sm^{4+}$, $Eu^{4+}$, $Gd^{4+}$, $Tb^{4+}$, $Dy^{4+}$, $Ho^{4+}$, $Er^{4+}$, $Tm^{4+}$, $Yb^{4+}$, or $Lu^{4+}$ (or any combination of one or more of the lanthanides).

Example 39. The method of example 1 (as well as subject matter of one or more of any combination of examples 2-11 and 38, in whole or in part), wherein said transition metal comprises all stable ions of: Copper, Iron, Cobalt, Manganese, Vanadium, Chromium, Titanium, Zinc, Molybdenum, Niobium, Zirconium, Tungsten, Technetium, Hafnium, Scandium, Nickel, Tantalum, Yttrium, Silver, Ruthenium, Rhodium, Palladium, Osmium, Platinum, Iridium, Seaborgium, Rhenium, Dubnium, Cadmium, Rutherfordium, Gold, Roentgenium, Mercury, Copernicium, Darmstadtium, Hassium, or Meitnerium, Bohrium (or any combination of one or more of the transition metals).

Example 40. The photonic device of example 12 (as well as subject matter of one or more of any combination of examples 13-24, in whole or in part), wherein said lanthanide comprises: $Ln^{2+}$, $Ce^{2+}$, $Pr^{2+}$, $Nd^{2+}$, $Pm^{2+}$, $Sm^{2+}$, $Eu^{2+}$, $Gd^{2+}$, $Th^{2+}$, $Dy^{2+}$, $Ho^{2+}$, $Er^{2+}$, $Tm^{2+}$, $Yb^{2+}$, $Lu^{2+}$, $Ln^{3+}$, $Ce^{3+}$, $Pr^{3+}$, $Nd^{3+}$, $Pm^{3+}$, $Sm^{3+}$, $Eu^{3+}$, $Gd^{3+}$, $Tb^{3+}$, $Dy^{3+}$, $Ho^{3+}$, $Er^{3+}$, $Tm^{3+}$, $Yb^{3+}$, $Lu^{3+}$, $Ln^{4+}$, $Ce^{4+}$, $Pr^{4+}$, $Nd^{4+}$, $Pm^{4+}$, $Sm^{4+}$, $Eu^{4+}$, $Gd^{4+}$, $Tb^{4+}$, $Dy^{4+}$, $Ho^{4+}$, $Er^{4+}$. $Tm^{4+}$. $Yb^{4+}$, or $Lu^{4+}$ (or any combination of one or more of the lanthanides).

Example 41. The photonic device of example 12 (as well as subject matter of one or more of any combination of examples 13-24 and 40, in whole or in part), wherein said transition metal comprises all stable ions of: Copper, Iron, Cobalt, Manganese, Vanadium, Chromium, Titanium, Zinc, Molybdenum, Niobium, Zirconium, Tungsten, Technetium, Hafnium, Scandium, Nickel, Tantalum, Yttrium, Silver, Ruthenium, Rhodium, Palladium, Osmium, Platinum, Iridium, Seaborgium, Rhenium, Dubnium, Cadmium, Rutherfordium, Gold, Roentgenium, Mercury, Copernicium, Darmstadtium, Hassium, Meitnerium, or Bohrium (or any combination of one or more of the transition metals).

Example 42. The power source device of example 25 (as well as subject matter of one or more of any combination of examples 26-37, in whole or in part), wherein said lanthanide comprises: $Ln^{2+}$, $Ce^{2+}$, $Pr^{2+}$, $Nd^{2+}$, $Pm^{2+}$, $Sm^{2+}$, $Eu^{2+}$, $Gd^{2+}$, $Tb^{2+}$, $Dy^{2+}$, $Ho^{2+}$, $Er^{2+}$, $Tm^{2+}$, $Yb^{2+}$, $Lu^{2+}$, $Ln^{3+}$, $Ce^{3+}$, $Pr^{3+}$, $Nd^{3+}$, $Pm^{3+}$. $Sm^{3+}$, $Eu^{3+}$, $Gd^{3+}$, $Tb^{3+}$, $Dy^{3+}$, $Ho^{3+}$, $Er^{3+}$, $Tm^{3+}$, $Yb^{3+}$, $Lu^{3+}$, $Ln^{4+}$, $Ce^{4+}$, $Pr^{4+}$, $Nd^{4+}$, $Pm^{4+}$, $Sm^{4+}$, $Eu^{4+}$, $Gd^{4+}$, $Tb^{4+}$, $Dy^{4+}$, $Ho^{4+}$. $Er^{4+}$, $Tm^{4+}$, $Yb^{4+}$, or $Lu^{4+}$ (or any combination of one or more of the lanthanides).

Example 43. The power source device of example 25 (as well as subject matter of one or more of any combination of examples 26-37 and 42, in whole or in part), wherein said transition metal comprises all stable ions of: Copper, Iron, Cobalt, Manganese, Vanadium, Chromium, Titanium, Zinc, Molybdenum, Niobium, Zirconium, Tungsten, Technetium, Hafnium, Scandium, Nickel, Tantalum, Yttrium, Silver, Ruthenium, Rhodium, Palladium, Osmium, Platinum, Iridium, Seaborgium, Rhenium, Dubnium, Cadmium, Rutherfordium, Gold, Roentgenium, Mercury, Copernicium, Darmstadtium, Hassium, Meitnerium, or Bohrium (or any combination of one or more of the transition metals).

Example 44. The method of using any of the devices (or their portions of devices, systems, subsystems, structures, substructures, components, subcomponents, material, components, or sub-components) provided in any one or more of examples 1-43, in whole or in part or embodiments disclosed herein.

Example 45. The method of manufacturing any of the devices (or their portions of devices, systems, subsystems, structures, substructures, components, subcomponents, material, components, or sub-components) provided in any one or more of examples 1-43, in whole or in part or embodiments disclosed herein.

REFERENCES

The devices, systems, apparatuses, modules, components, compositions, materials, articles of manufacture, compounds, computer program products, non-transitory computer readable medium, and methods of various embodiments of the invention disclosed herein may utilize aspects (such as devices, systems, apparatuses, modules, components, compositions, materials, articles of manufacture, compounds, computer program products, non-transitory computer readable medium, and methods) disclosed in the following references, applications, publications and patents and which are hereby incorporated by reference herein in their entirety (and which are not admitted to be prior art with respect to the present invention by inclusion in this section).

1. U.S. Patent Application Publication No. US 2015/0083923 A1, Stanton et al., "Linear-Response Nanocrystal Scintillators and Methods of Using the Same", Mar. 26, 2015.

2. U.S. Patent Application Publication No. US 2005/0285041 A1, Srivastava et al., "Scintillator Compositions, Related Processes, and Articles of Manufacture", Dec. 29, 2005.
3. U.S. Patent Application Publication No. US 2010/0230601 A1, Martins Loureiro et al., "Composition, Article, and Method", Sep. 16, 2010.
4. U.S. Patent Application Publication No. US 2013/0299720 A1, Osinski et al., "Halide-Based Scintillator Nano Material", Nov. 14, 2013.
5. U.S. Patent Application Publication No. US 2016/0293858-A1. Brandt et al. [MIT], "Optoelectric Devices Fabricated with Defect Tolerant Semiconductors," Oct. 6, 2016.
6. U.S. Utility patent application Ser. No. 17/604,158, entitled "PEROVSKITE-BASED SCINTILLATOR AND METHODS OF USING THE SAME", filed Oct. 15, 2021; Publication No. US 2022-0195287 A1, Jun. 23, 2022.
7. International Patent Application Serial No. PCT/US2020/028749, entitled "PEROVSKITE-BASED SCINTILLATOR AND METHODS OF USING THE SAME", filed Apr. 17, 2020; Publication No. WO 2020/214942, Oct. 22, 2020.
8. CRANE et al., "Single-Source Vapor Deposition of Quantum-Cutting $Yb^{3+}$:$CsPb(Cl_{1-x}Br_x)_3$ and Other Complex Metal-Halide Perovskites," ACS Applied Energy Materials, Vol. 2, 2019 (Published May 24, 2019), pp. 4560-4565.
9. KARMAKAR et al., "Mechanochemical Synthesis of 0D and 3D Cesium Lead Mixed Halide Perovskites," Electronic Supplementary Information (ESI), Chemical Communications, Vol. 35, 2019, pp. S1-S15.
10. PAL et al., "All-Solid-State Mechanochemical Synthesis and Post-Synthetic Transformation of Inorganic Perovskite-type Halides," Chemistry-A European Journal, Vol. 24, 2018 (Version of Record Online Jan. 16, 2018), pp. 1811-1815.
11. KROUPA et al., "Quantum-Cutting Ytterbium-Doped $CsPb(Cl_{1-x}Br_x)_3$ Perovskite Thin Films with Photoluminescence Quantum Yields over 190%," ACS Energy Letters, Vol. 3, 2018 (Published: Sep. 11, 2018), pp. 2390-2395.
12. DAGNALL et al., "Ytterbium-Doped Cesium Lead Chloride Perovskite as an X-ray Scintillator with High Light Yield," ACS Omega, Vol. 7, 2022 (Published Jun. 6, 2022), pp. 20968-20974.
13. ZHOU et al., "Metal-Doped Lead Halide Perovskites: Synthesis, Properties, and Optoelectronic Applications," Chemistry Materials, Vol. 30, 2018 (Published Aug. 27, 2018), pp. 6589-6613.
14. LOU et al., "B-Site Doped Lead Halide Perovskites: Synthesis, Band Engineering, Photophysics, and Light Emission Applications," Journal of Materials Chemistry C. Vol. 7, 2019 (Published Jan. 25, 2019), pp. 2781-2808.

In summary, while the present invention has been described with respect to specific embodiments, many modifications, variations, alterations, substitutions, and equivalents will be apparent to those skilled in the art. The present invention is not to be limited in scope by the specific embodiment described herein. Indeed, various modifications of the present invention, in addition to those described herein, will be apparent to those of skill in the art from the foregoing description and accompanying drawings. Accordingly, the invention is to be considered as limited only by the spirit and scope of the following claims including all modifications and equivalents.

Still other embodiments will become readily apparent to those skilled in this art from reading the above-recited detailed description and drawings of certain exemplary embodiments. It should be understood that numerous variations, modifications, and additional embodiments are possible, and accordingly, all such variations, modifications, and embodiments are to be regarded as being within the spirit and scope of this application. For example, regardless of the content of any portion (e.g., title, field, background, summary, abstract, drawing figure, etc.) of this application, unless clearly specified to the contrary, there is no requirement for the inclusion in any claim herein or of any application claiming priority hereto of any particular described or illustrated activity or element, any particular sequence of such activities, or any particular interrelationship of such elements. Moreover, any activity can be repeated, any activity can be performed by multiple entities, and/or any element can be duplicated. Further, any activity or element can be excluded, the sequence of activities can vary, and/or the interrelationship of elements can vary. Unless clearly specified to the contrary, there is no requirement for any particular described or illustrated activity or element, any particular sequence or such activities, any particular size, speed, material, dimension or frequency, or any particular interrelationship of such elements. Accordingly, the descriptions and drawings are to be regarded as illustrative in nature, and not as restrictive. Moreover, when any number or range is described herein, unless clearly stated otherwise, that number or range is approximate. When any range is described herein, unless clearly stated otherwise, that range includes all values therein and all sub ranges therein. Any information in any material (e.g., a United States/foreign patent, United States/foreign patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such incorporated by reference material is specifically not incorporated by reference herein.

What is claimed is:

1. A method of forming a lanthanide or transition metal doped metal halide perovskite material, comprising:
- combining a monovalent metal cation-halide compound, a divalent metal cation-halide compound, and a lanthanide or transition metal halide compound in a liquid solvent;
- evaporating the liquid solvent to form a powder; and
- annealing the powder at or below about 200 degrees C. to form the lanthanide or transition metal doped metal halide perovskite material.

2. The method of claim 1, wherein the monovalent metal cation-halide compound is cesium chloride.

3. The method of claim 1, wherein the divalent metal cation-halide compound is lead chloride.

4. The method of claim 1, wherein the lanthanide or transition metal halide compound is lanthanide or transition metal chloride.

5. The method of claim 1, wherein:
- the monovalent metal cation-halide compound is cesium chloride;
- the divalent metal cation-halide compound is lead chloride;
- the lanthanide or transition metal halide compound is lanthanide or transition metal chloride; and wherein said lanthanide or transition metal doped metal halide perovskite material is lanthanide or transition metal doped cesium lead chloride.

6. The method of claim 5, wherein said annealing of the powder to form lanthanide or transition metal doped cesium lead chloride includes:

annealing to form said lanthanide or transition metal doped cesium lead chloride with a dopant ion concentration below about 5 percent.

7. The method as in any one of claim 1 or 5, wherein the liquid solvent is water.

8. The method as in any one of claim 1 or 5, further comprising using the lanthanide or transition metal doped metal halide perovskite material is to receive emission.

9. The method as in any one of claim 1 or 5, further comprising using the lanthanide or transition metal doped metal halide perovskite material as a material for a scintillator device, scintillator region, scintillator component, scintillator layer, or scintillator module.

10. The method of claim 9, further comprising using said scintillator device, scintillator region, scintillator component, scintillator layer, or scintillator module for one of the following:

a) one or more photovoltaic (PV) devices, and optionally, said one or more photovoltaic (PV) devices are solar cells;
b) one or more photodetectors;
c) one or more light emitting diodes (LEDs);
d) one or laser Diodes (LDs);
e) one or luminescent solar concentrators;
f) one or more nuclear batteries; or
g) a photomultiplier tube (PMT).

11. The method of claim 1, wherein said lanthanide comprises: $Ln^{2+}$, $Ce^{2+}$, $Pr^{2+}$, $Nd^{2+}$, $Pm^{2+}$, $Sm^{2+}$, $Eu^{2+}$, $Gd^{2+}$, $Tb^{2+}$, $Dy^{2+}$, $Ho^{2+}$, $Er^{2+}$, $Tm^{2+}$, $Yb^{2+}$, $Lu^{2+}$, $Ln^{3+}$, $Ce^{3+}$, $Pr^{3+}$, $Nd^{3+}$, $Pm^{3+}$, $Sm^{3+}$, $Eu^{3+}$, $Gd^{3+}$, $Tb^{3+}$, $Dy^{3+}$, $Ho^{3+}$, $Er^{3+}$, $Tm^{3+}$, $Yb^{3+}$, $Lu^{3+}$, $Ln^{4+}$, $Ce^{4+}$, $Pr^{4+}$, $Nd^{4+}$, $Pm^{4+}$, $Sm^{4+}$, $Eu^{4+}$, $Gd^{4+}$, $Tb^{4+}$, $Dy^{4+}$, $Ho^{4+}$, $Er^{4+}$, $Tm^{4+}$, $Yb^{4+}$, or $Lu^{4+}$.

12. The method of claim 1, wherein said transition metal comprises all stable ions of: Copper, Iron, Cobalt, Manganese, Vanadium, Chromium, Titanium, Zinc, Molybdenum, Niobium, Zirconium, Tungsten, Technetium, Hafnium, Scandium, Nickel, Tantalum, Yttrium, Silver, Ruthenium, Rhodium, Palladium, Osmium, Platinum, Iridium, Seaborgium, Rhenium, Dubnium, Cadmium, Rutherfordium, Gold, Roentgenium, Mercury, Copernicium, Darmstadtium, Hassium, Meitnerium, or Bohrium.

13. A photonic device, comprising:

either:

a) a semiconductor directly or indirectly coupled to a first electrode and a second electrode, or
b) a photomultiplier tube (PMT); and a lanthanide or transition metal doped metal halide perovskite material located adjacent to either:

a) said semiconductor, said first electrode, and said second electrode in electromagnetic energy communication with said lanthanide or transition metal doped metal halide perovskite material, or
b) said photomultiplier tube (PMT) in electromagnetic energy communication with said lanthanide or transition metal doped metal halide perovskite material; and wherein the lanthanide or transition metal doped metal halide perovskite material is formed by a method including:

combining a monovalent metal-halide compound, a divalent metal-halide compound, and a lanthanide or transition metal halide compound in a liquid solvent;

evaporating the liquid solvent to form a powder; and annealing the powder at or below about 200 degrees C. to form a lanthanide or transition metal doped metal halide perovskite.

14. The photonic device of claim 13, wherein the monovalent metal cation-halide compound is cesium chloride.

15. The photonic device of claim 13, wherein the divalent metal cation-halide compound is lead chloride.

16. The photonic device of claim 13, wherein the lanthanide or transition metal halide compound is lanthanide or transition metal chloride.

17. The photonic device of claim 13, wherein:

the monovalent metal cation-halide compound is cesium chloride;

the divalent metal cation-halide compound is lead chloride;

the lanthanide or transition metal halide compound is lanthanide or transition metal chloride; and wherein said lanthanide or transition metal doped metal halide perovskite material is lanthanide or transition metal doped cesium lead chloride.

18. The photonic device of claim 17, wherein said annealing of the powder to form said lanthanide or transition metal doped cesium lead chloride includes:

annealing to form said lanthanide or transition metal doped cesium lead chloride with a dopant ion concentration below about 5 percent.

19. The photonic device as in any one of claim 13 or 17, wherein the liquid solvent is water.

20. The photonic device as in any one of claim 13 or 17, wherein the lanthanide or transition metal doped metal halide perovskite material is configured to receive emission.

21. The photonic device as in any one of claim 13 or 17, wherein the lanthanide or transition metal doped metal halide perovskite material is used for a scintillator device, scintillator region, scintillator component, scintillator layer, or scintillator module.

22. The photonic device of claim 21, wherein the scintillator device, scintillator region, scintillator component, scintillator layer, or scintillator module is configured to receive emission.

23. The photonic device of claim 21, wherein said semiconductor, said first electrode, said second electrode, and said scintillator device, scintillator region, scintillator component, scintillator layer, or scintillator module are configured wherein the photonic device is one of the following:

a) one or more photovoltaic (PV) devices, and optionally, said one or more photovoltaic (PV) devices are solar cells;
b) one or more photodetectors;
c) one or more light emitting diodes (LEDs);
d) one or more laser Diodes (LDs);
e) one or luminescent solar concentrators; or
f) one or more nuclear batteries.

24. The photonic device of claim 23, wherein said photodetector comprises:

micro photomultiplier, photodiode, or silicon photomultiplier.

25. The photonic device of claim 13, wherein said lanthanide comprises: $Ln^{2+}$, $Ce^{2+}$, $Pr^{2+}$, $Nd^{2+}$, $Pm^{2+}$, $Sm^{2+}$, $Eu^{2+}$, $Gd^{2+}$, $Tb^{2+}$, $Dy^{2+}$, $Ho^{2+}$, $Er^{2+}$, $Tm^{2+}$, $Yb^{2+}$, $Lu^{2+}$, $Ln^{3+}$, $Ce^{3+}$, $Pr^{3+}$, $Nd^{3+}$, $Pm^{3+}$, $Sm^{3+}$, $Eu^{3+}$, $Gd^{3+}$, $Tb^{3+}$, $Dy^{3+}$, $Ho^{3+}$, $Er^{3+}$, $Tm^{3+}$, $Yb^{3+}$, $Lu^{3+}$, $Ln^{4+}$, $Ce^{4+}$, $Pr^{4+}$, $Nd^{4+}$, $Pm^{4+}$, $Sm^{4+}$, $Eu^{4+}$, $Gd^{4+}$, $Tb^{4+}$, $Dy^{4+}$, $Ho^{4+}$, $Er^{4+}$, $Tm^{4+}$, $Yb^{4+}$, or $Lu^{4+}$.

26. The photonic device of claim 13, wherein said transition metal comprises all stable ions of: Copper, Iron, Cobalt, Manganese, Vanadium, Chromium, Titanium, Zinc, Molybdenum, Niobium, Zirconium, Tungsten, Technetium, Hafnium, Scandium, Nickel, Tantalum, Yttrium, Silver, Ruthenium, Rhodium, Palladium, Osmium, Platinum, Iridium, Seaborgium, Rhenium, Dubnium, Cadmium, Rutherfordium, Gold, Roentgenium, Mercury, Copernicium, Darmstadtium, Hassium, Meitnerium, or Bohrium.

27. A power source device, comprising:

an emission source;

a photonic device in emission communication with said emission source, wherein the photonic device comprises either:

a) a semiconductor directly or indirectly coupled between a first electrode and a second electrode, or b) a photomultiplier tube (PMT); and a lanthanide or transition metal doped metal halide perovskite material located adjacent to either:

a) said semiconductor, said first electrode, and said second electrode in electromagnetic energy communication with said lanthanide or transition metal doped metal halide perovskite material, or b) said photomultiplier tube (PMT) in electro in electromagnetic energy communication with said lanthanide or transition metal doped metal halide perovskite material; and wherein the lanthanide or transition metal doped metal halide perovskite material is formed by a method including:

combining a monovalent metal-halide compound, a divalent metal-halide compound, and a lanthanide or transition metal halide compound in a liquid solvent;

evaporating the liquid solvent to form a powder; and annealing the powder at or below about 200 degrees C. to form lanthanide or transition metal doped metal halide perovskite material.

28. The power source device of claim 27, wherein the monovalent metal cation-halide compound is cesium chloride.

29. The power source device of claim 27, wherein the divalent metal cation-halide compound is lead chloride.

30. The power source device of claim 27, wherein the lanthanide or transition metal halide compound is lanthanide or transition metal chloride.

31. The power source device of claim 27, wherein:

the monovalent metal cation-halide compound is cesium chloride;

the divalent metal cation-halide compound is lead chloride;

the lanthanide or transition metal halide compound is lanthanide or transition metal chloride; and wherein said lanthanide or transition metal doped metal halide perovskite material is lanthanide or transition metal doped cesium lead chloride.

32. The power source device of claim 31, wherein said annealing of the powder to form said lanthanide or transition metal doped cesium lead chloride includes:

annealing to form said lanthanide or transition metal doped cesium lead chloride with a dopant ion concentration below about 5 percent.

33. The power source device as in any one of claim 27 or 31, wherein the liquid solvent is water.

34. The power source device as in any one of claim 27 or 31, wherein said emission source comprises:

alpha emission, beta emission, gamma radiation, or x-ray radiation.

35. The power source device as in any one of claim 27 or 31, wherein the lanthanide or transition metal doped metal halide perovskite material is used for a scintillator device, scintillator region, scintillator component, scintillator layer, or scintillator module.

36. The power source device of claim 35, wherein said semiconductor, said first electrode, said second electrode, and said scintillator device, scintillator region, scintillator component, scintillator layer, or scintillator module are configured wherein the photonic device is one of the following:

a) one or more photovoltaic (PV) devices, and optionally, said one or more photovoltaic (PV) devices are solar cells;

b) one or more photodetectors;

c) one or more light emitting diodes (LEDs);

d) one or laser Diodes (LDs);

e) one or luminescent solar concentrators; or f) one or more nuclear batteries.

37. The power source device of claim 36, wherein said photodetector comprises:

micro photomultiplier, photodiode, or silicon photomultiplier.

38. The power source device of claim 35, wherein said emission source comprises:

alpha emission, beta emission, gamma radiation, or x-ray radiation.

39. The power source device of claim 27, wherein said lanthanide comprises: $Ln^{2+}$, $Ce^{2+}$, $Pr^{2+}$, $Nd^{2+}$, $Pm^{2+}$, $Sm^{2+}$, $Eu^{2+}$, $Gd^{2+}$, $Tb^{2+}$, $Dy^{2+}$, $Ho^{2+}$, $Er^{2+}$, $Tm^{2+}$, $Yb^{2+}$, $Lu^{2+}$, $Ln^{3+}$, $Ce^{3+}$, $Pr^{3+}$, $Nd^{3+}$, $Pm^{3+}$, $Sm^{3+}$, $Eu^{3+}$, $Gd^{3+}$, $Tb^{3+}$, $Dy^{3+}$, $Ho^{3+}$, $Er^{3+}$, $Tm^{3+}$, $Yb^{3+}$, $Lu^{3+}$, $Ln^{4+}$, $Ce^{4+}$, $Pr^{4+}$, $Nd^{4+}$, $Pm^{4+}$, $Sm^{4+}$, $Eu^{4+}$, $Gd^{4+}$, $Tb^{4+}$, $Dy^{4+}$, $Ho^{4+}$, $Er^{4+}$, $Tm^{4+}$, $Yb^{4+}$, or $Lu^{4+}$.

40. The power source device of claim 27, wherein said transition metal comprises all stable ions of: Copper, Iron, Cobalt, Manganese, Vanadium, Chromium, Titanium, Zinc, Molybdenum, Niobium, Zirconium, Tungsten, Technetium, Hafnium, Scandium, Nickel, Tantalum, Yttrium, Silver, Ruthenium, Rhodium, Palladium, Osmium, Platinum, Iridium, Seaborgium, Rhenium, Dubnium, Cadmium, Rutherfordium, Gold, Roentgenium, Mercury, Copernicium, Darmstadtium, Hassium, Meitnerium, or Bohrium.

* * * * *